US008890434B2

(12) United States Patent
Shimomura et al.

(10) Patent No.: US 8,890,434 B2
(45) Date of Patent: Nov. 18, 2014

(54) SYSTEM AND METHOD FOR SINGLE CONDUCTOR POWER, CONTROL, AND FEEDBACK SYSTEM

(71) Applicants: Tsutomu Shimomura, Incline Village, NV (US); Mark Peting, Yamhill, OR (US); Dale Beyer, Portland, OR (US)

(72) Inventors: Tsutomu Shimomura, Incline Village, NV (US); Mark Peting, Yamhill, OR (US); Dale Beyer, Portland, OR (US)

(73) Assignee: Neofocal Systems, Inc., Portland, OR (US)

( * ) Notice: Subject to any disclaimer, the term of this patent is extended or adjusted under 35 U.S.C. 154(b) by 60 days.

(21) Appl. No.: 13/767,868

(22) Filed: Feb. 14, 2013

(65) Prior Publication Data

US 2013/0285553 A1 Oct. 31, 2013

Related U.S. Application Data

(63) Continuation of application No. 13/309,867, filed on Dec. 2, 2011, which is a continuation of application No. 12/590,449, filed on Nov. 6, 2009, now Pat. No. 8,344,659.

(51) Int. Cl.
*H05B 33/08* (2006.01)
*H05B 37/02* (2006.01)

(52) U.S. Cl.
CPC ........ *H05B 33/0839* (2013.01); *H05B 33/0842* (2013.01); *H05B 37/0245* (2013.01)
USPC ........ 315/291; 315/185 R; 315/246; 315/308; 315/312; 345/102; 345/213; 345/519; 345/520

(58) Field of Classification Search
USPC .......... 315/169.3, 185 R, 246, 291, 307, 308, 315/312; 345/102, 213, 504, 519, 520, 522
See application file for complete search history.

(56) References Cited

U.S. PATENT DOCUMENTS 8,471,497 B2 * 6/2013 Ruan et al. ..................... 315/307
2007/0296354 A1 * 12/2007 Okabe ........................... 315/307

\* cited by examiner

*Primary Examiner* — Douglas W Owens
*Assistant Examiner* — Thai Pham
(74) *Attorney, Agent, or Firm* — Dag Johansen, Esq.

(57) ABSTRACT

To control multiple electronic circuits organized in a series configuration, this document introduces a single-wire power, control, and feedback system. Specifically, individually controlled electronic circuits are arranged in a series configuration that is driven by a control unit located at the head of the series. The head-end control unit provides both electrical power and control signals down a single wire to drive all of the electronic circuits in the series in a manner that allows each electronic circuit to periodically draw power from the single wire and receive control information. Each electronic circuit in the series may communicate back to the head-end control unit by drawing power or not during a specified time slot.

14 Claims, 23 Drawing Sheets

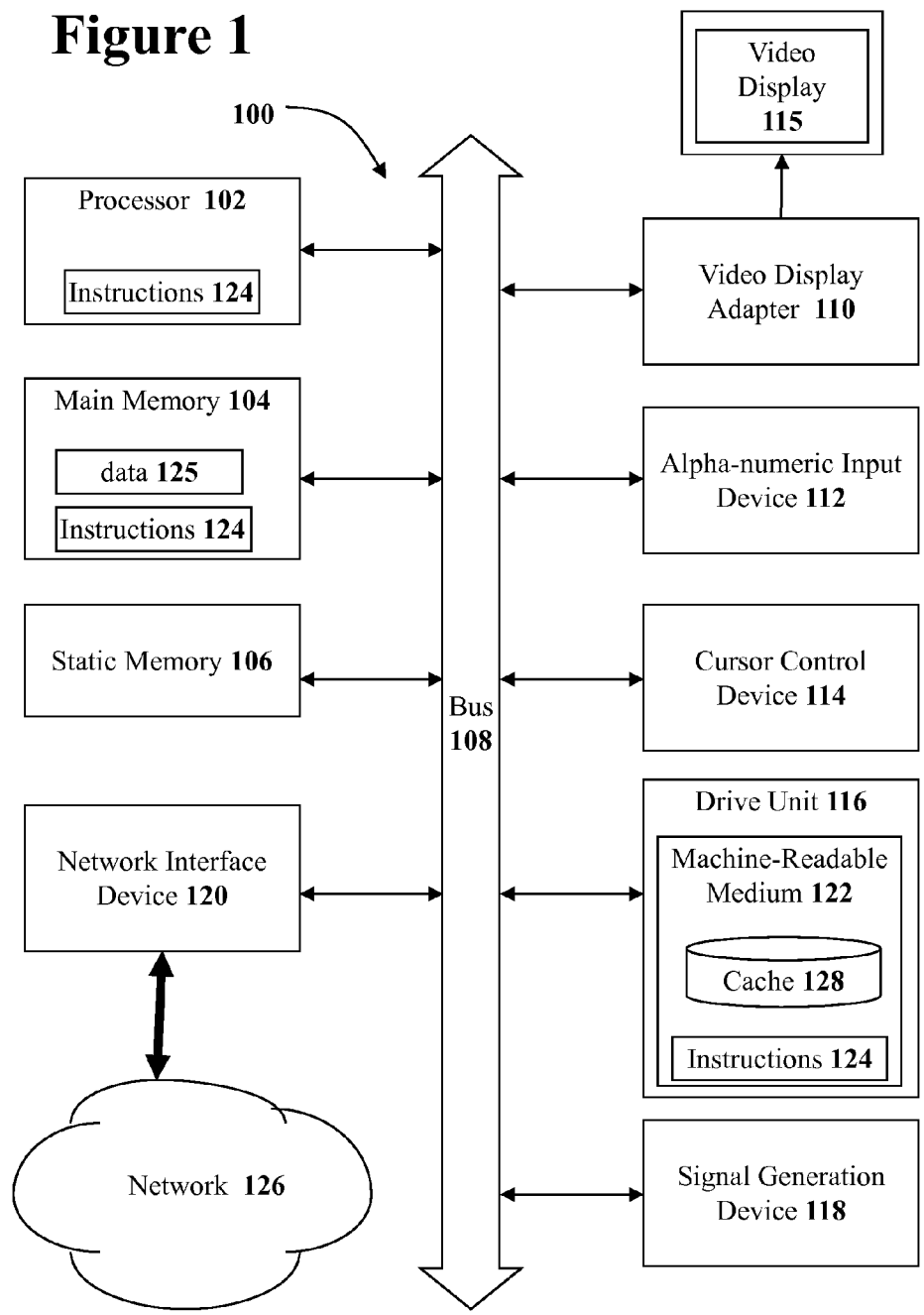

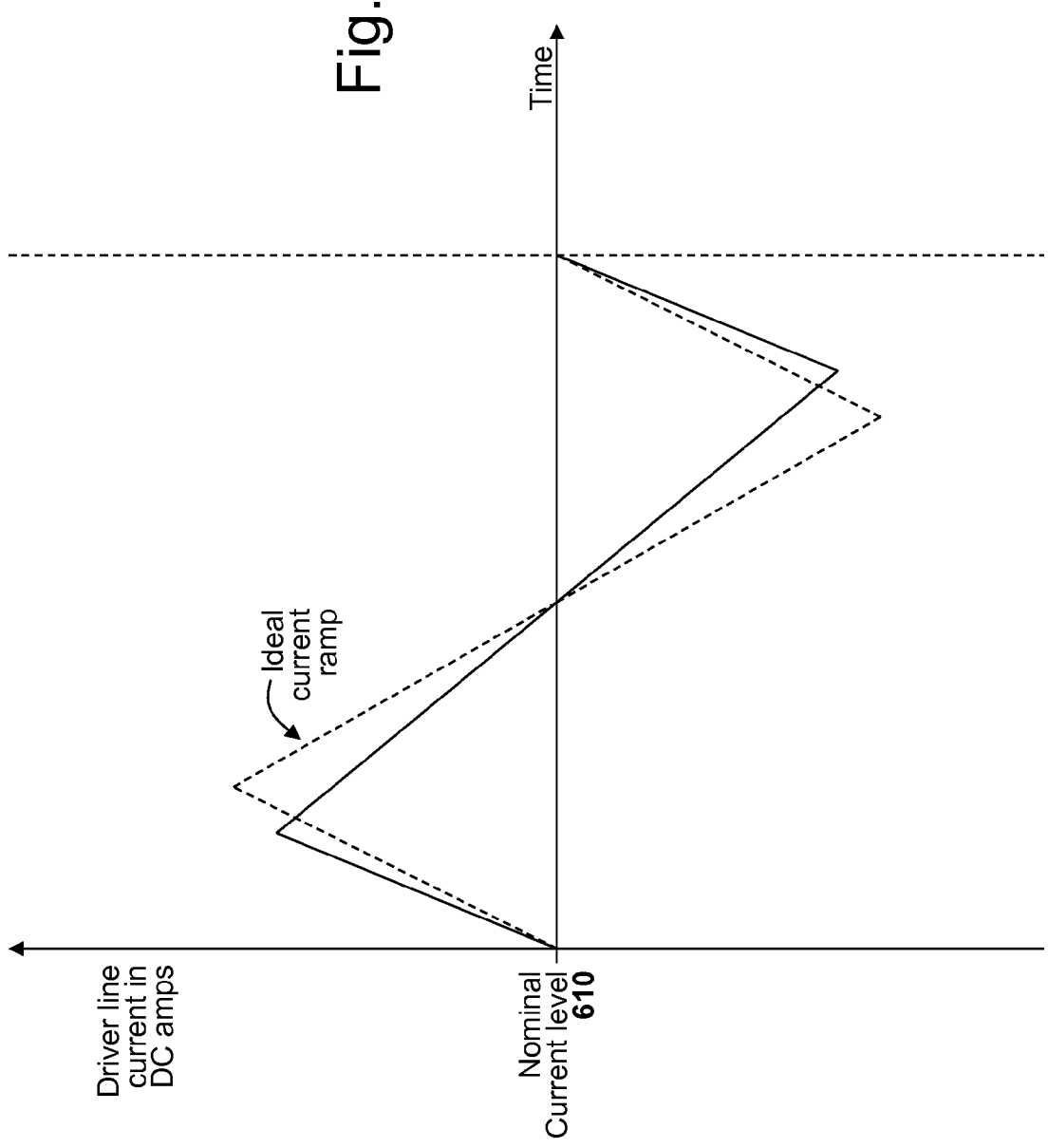

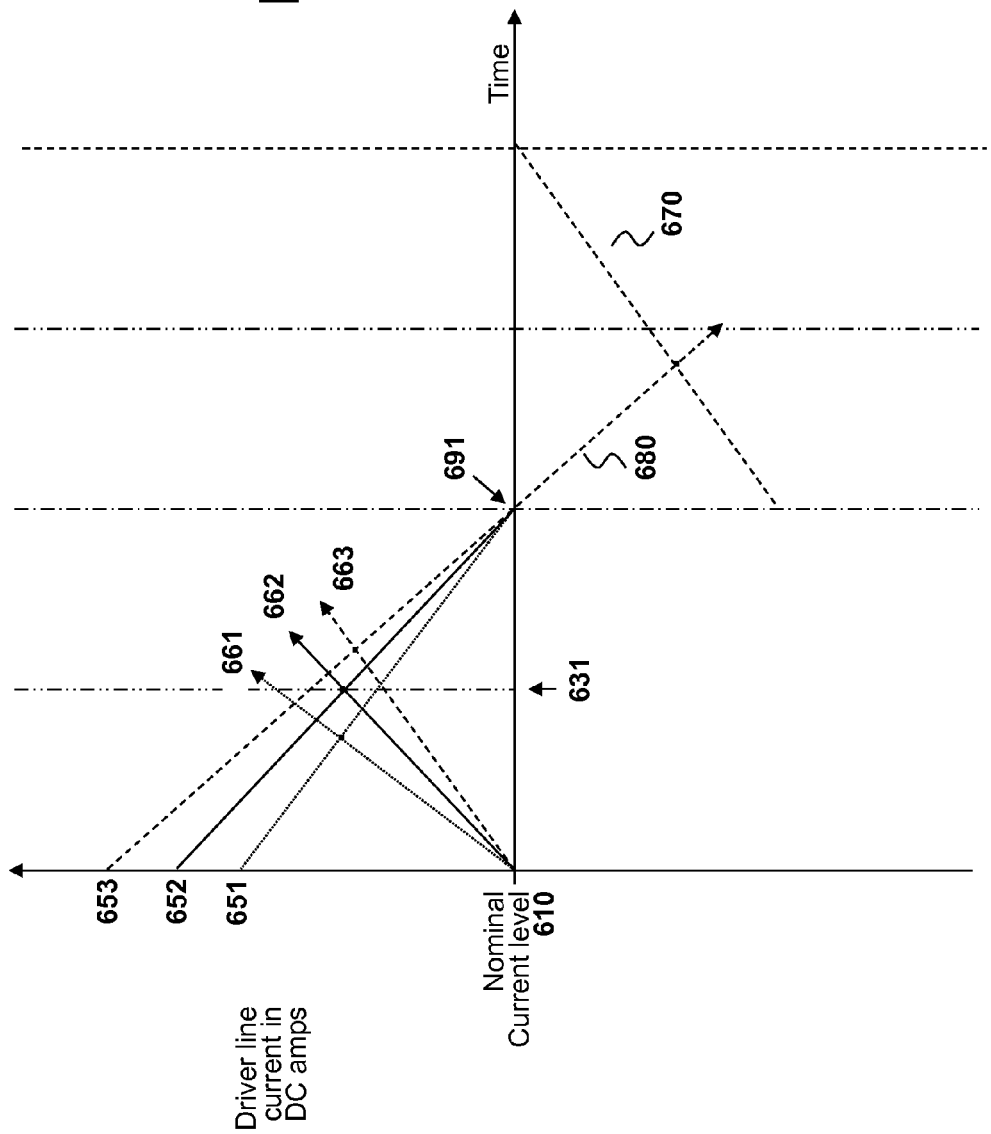

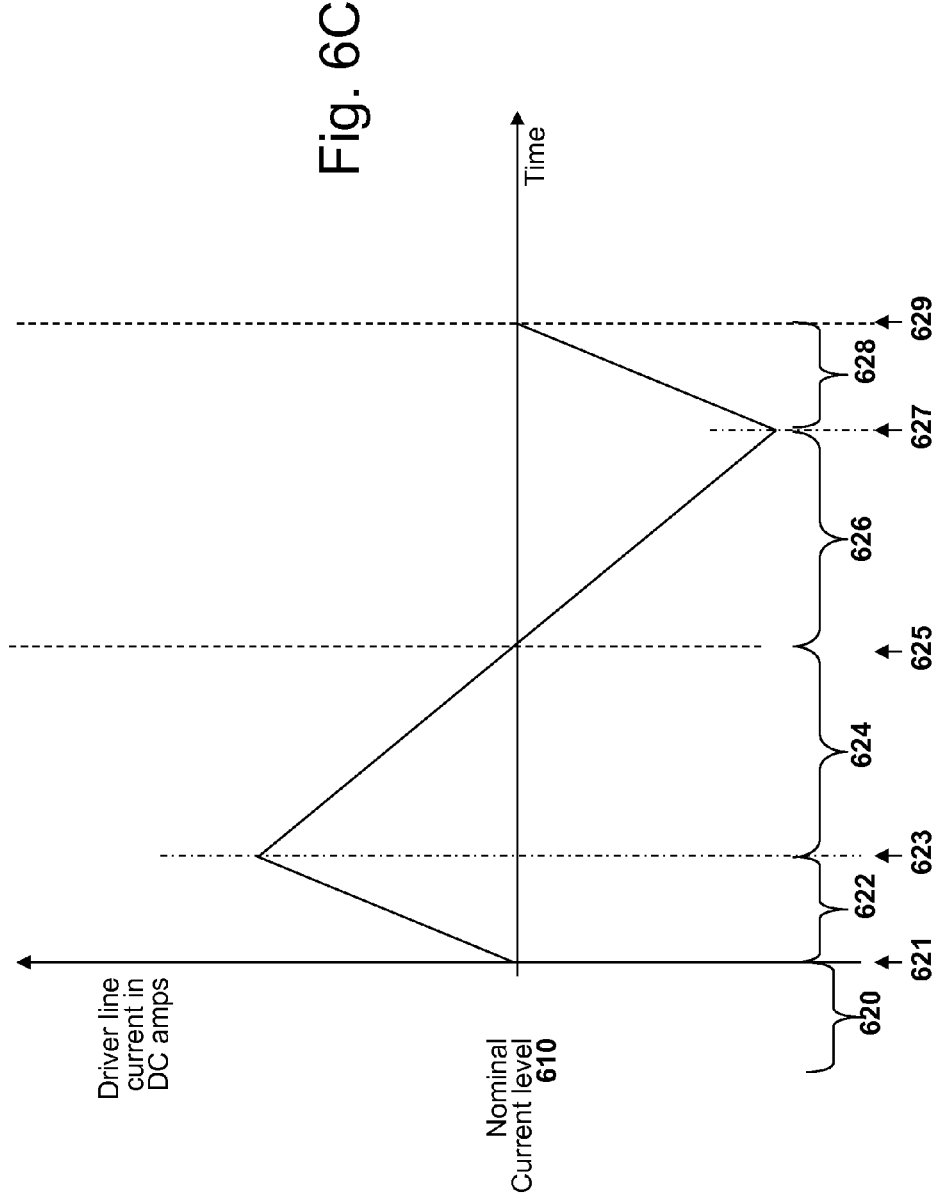

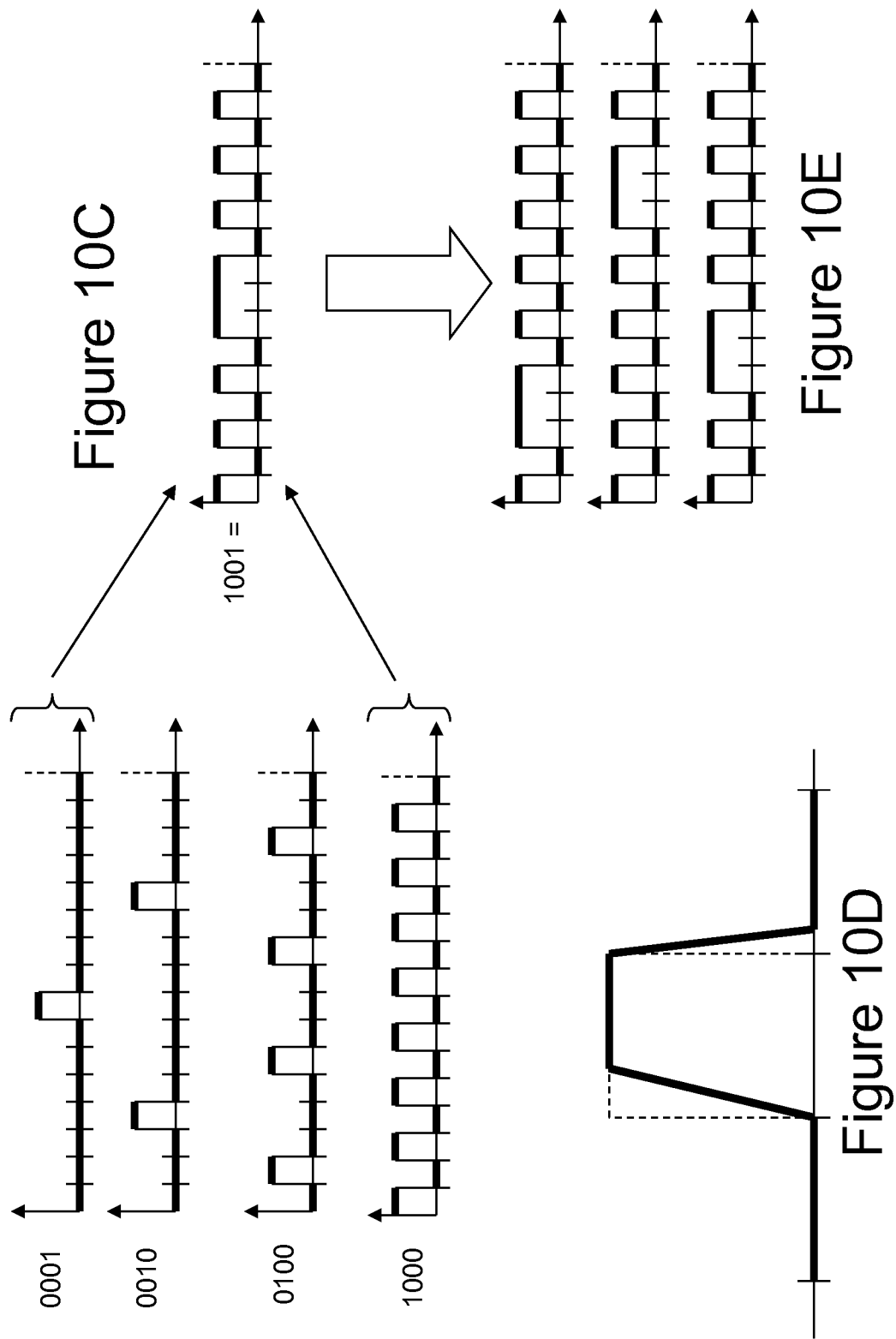

SYSTEM AND METHOD FOR SINGLE CONDUCTOR POWER, CONTROL, AND FEEDBACK SYSTEM

TECHNICAL FIELD

The present invention relates to the field of electronic control systems. In particular, but not by way of limitation, the present invention discloses techniques for providing electrical power and control signals to drive electric components.

BACKGROUND

Light Emitting Diodes (LEDs) are a very energy efficient electronic lighting source. The generation of LEDs emitted red light with a very small amount of illuminating power. However, modern LEDs can now generate light across the visible, ultraviolet, and infrared wavelengths. Furthermore, modern LEDs can be provided with a significant amount of current such that LEDs can produce enough light to be used as illumination sources.

LEDs present many advantages over traditional sources of lighting including energy efficiency, a longer lifetime, greater durability, a small form factor, and a very fast switching speed. These many advantages fueled the use of LEDs in a wide variety of applications. However, LEDs are still relatively expensive in up-front costs compared to incandescent and fluorescent light sources. Furthermore, LEDs generally require more precise current and heat management than traditional lighting sources. The first LEDs were used mainly as indicator lights on electronic equipment. LEDs have been ideal for portable electronics due to their low-energy usage and small form factor. However, in more recent years, the availability of new LED colors and increases in brightness have allowed LEDs to be used in many new applications.

The small size of LEDs and the ability to control the switching of LEDs using computers have allowed for the development of LED based display systems. Specifically, a two dimensional array of individually controlled LEDs can be used to display words and images. Thus, LEDs now provide the light source for many modern electronic scoreboards and very large scale video display systems such as the large video display systems seen at sports arenas and at New York City's Times Square.

Although LED-based display systems have proven to work very well, the inherent difficulties and expense involved in creating such LED based video display systems have limited the deployments of LED-based video display systems. Carefully metered and individually controlled electric power must be provided to each LED in a two dimensional array of LEDs that creates a LED based video display system. To construct a monochrome high definition display system with a resolution of 1920×1080 picture elements (pixels) requires that the system provide 2,073,600 individual LEDs with carefully controlled electrical power. To create a multi-color high definition display system, three different colored LEDs (red, green, and blue) are required for each individual pixel such that 6,220,800 individual LEDs must receive carefully controlled electrical power. Thus, the design and manufacture of such large scale video display systems is both complex and very expensive.

Due to the challenges of controlling so many independent LEDs, large LED based video display systems cost many millions of dollars such that only very high end applications, such as large sports arenas, are able to purchase large LED based video display systems. Public video display systems for other situations generally use smaller conventional display technologies associated with television displays or use much simpler display systems such as large electronic scoreboards with only limited pre-arranged LED patterns for displaying team scores and game time. It would therefore be desirable to simplify the task of designing and constructing LED based display and lighting systems.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

FIG. 1 illustrates a diagrammatic representation of a machine in the example form of a computer system within which a set of instructions, for causing the machine to perform any one or more of the methodologies discussed herein, may be executed.

FIG. 6A illustrates ideal symmetrical current pulses and non ideal current pulses on the driver line.

FIG. 6B graphically illustrates how the FET switch timing computer works.

FIG. 6C illustrates a timeline of phases during a single data bit cycle.

FIG. 10C illustrates how the data patterns for the reduced flicker modulation system may be created.

FIG. 10D illustrates an imperfect current pulse and an ideal square pulse.

FIG. 10E illustrates the reduced flicker modulation data pattern of FIG. 10C after various different randomizations that reorder the pulses.

DETAILED DESCRIPTION

Figure 2A:
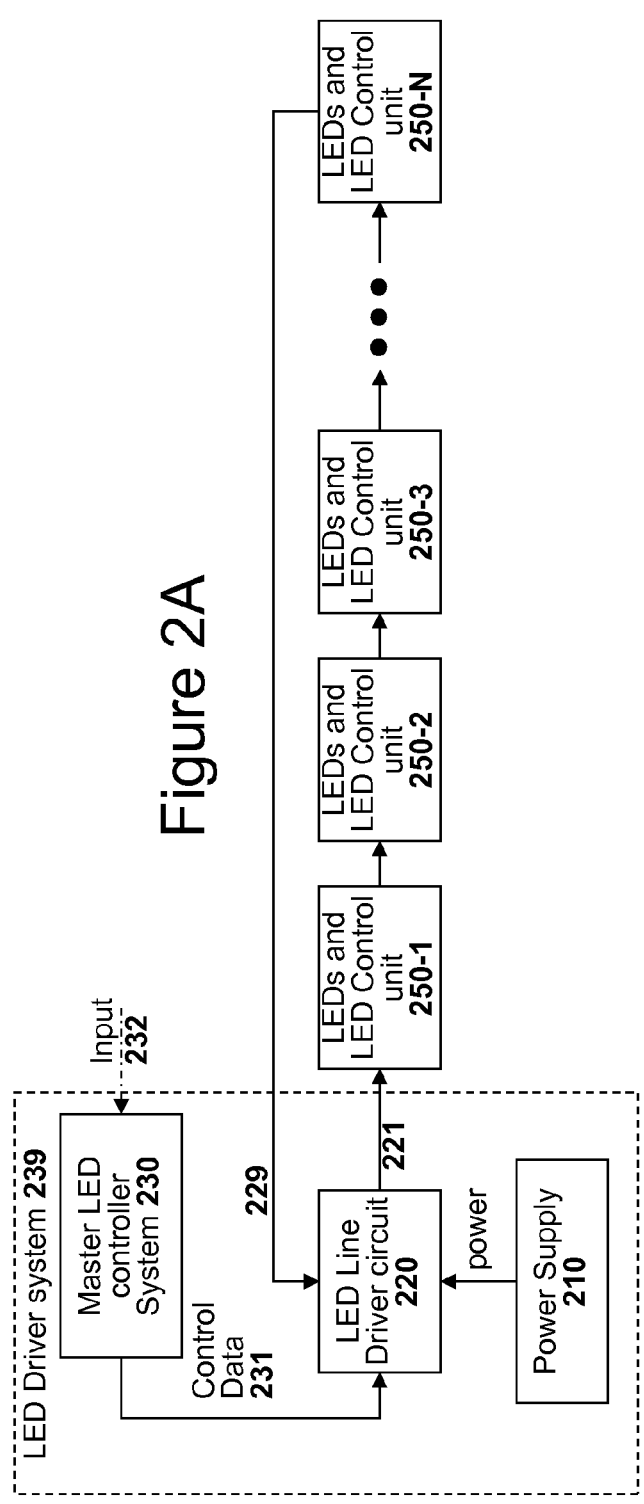
FIG. 2A illustrates a block diagram of the overall architecture of the single-wire multiple-LED control system of the present disclosure.

The following detailed description includes references to the accompanying drawings, which form a part of the detailed description. The drawings show illustrations in accordance with example embodiments. These embodiments, which are also referred to herein as "examples," are described in enough detail to enable those skilled in the art to practice the invention. It will be apparent to one skilled in the art that specific details in the example embodiments are not required in order to practice the present invention. For example, although the example embodiments are mainly disclosed with reference to a system that efficiently transmits output information to control Light Emitting Diodes (LEDs), the teachings of this disclosure can be used to transmit output information to control other light emitting components or even communicate bi-directionally with sensor devices that return data. The example embodiments may be combined, other embodiments may be utilized, or structural, logical and electrical changes may be made without departing from the scope what is claimed. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive or, such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

Computer Systems

The present disclosure concerns computer systems since computer systems are generally used to control LED lighting and display systems. FIG. 1 illustrates a diagrammatic representation of a machine in the example form of a computer system 100 that may be used to implement portions of the present disclosure. Within computer system 100 there are a set of instructions 124 that may be executed for causing the machine to perform any one or more of the methodologies discussed herein. In a networked deployment, the machine may operate in the capacity of a server machine or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of computer instructions (sequential or otherwise) that specify actions to be taken by that machine. Furthermore, while only a single machine is illustrated, the term "machine" shall also be taken to include any collection of machines that individually or jointly execute a set (or multiple sets) of instructions to perform any one or more of the methodologies discussed herein.

The example computer system 100 includes a processor 102 (e.g., a central processing unit (CPU), a graphics processing unit (GPU) or both), a main memory 104 and a static memory 106, which communicate with each other via a bus 108. The computer system 100 may further include a video display adapter 110 that drives a video display system 115 such as a Liquid Crystal Display (LCD) or a Cathode Ray Tube (CRT). The computer system 100 also includes an alphanumeric input device 112 (e.g., a keyboard), a cursor control device 114 (e.g., a mouse or trackball), a disk drive unit 116, an output signal generation device 118, and a network interface device 120.

The disk drive unit 116 includes a machine-readable medium 122 on which is stored one or more sets of computer instructions and data structures (e.g., instructions 124 also known as 'software') embodying or utilized by any one or more of the methodologies or functions described herein. The instructions 124 may also reside, completely or at least partially, within the main memory 104 and/or within the processor 102 during execution thereof by the computer system 100, the main memory 104 and the processor 102 also constituting machine-readable media. Note that the example computer system 100 illustrates only one possible example and that other computers may not have all of the components illustrated in FIG. 1

The instructions 124 may further be transmitted or received over a computer network 126 via the network interface device 120. Such transmissions may occur utilizing any one of a number of well-known transfer protocols such as the File Transport Protocol (FTP).

While the machine-readable medium 122 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies described herein, or that is capable of storing, encoding or carrying data structures utilized by or associated with such a set of instructions. The term "machine-readable medium" shall accordingly be taken to include, but not be limited to, solid-state memories, optical media, and magnetic media.

For the purposes of this specification, the term "module" includes an identifiable portion of code, computational or executable instructions, data, or computational object to achieve a particular function, operation, processing, or procedure. A module need not be implemented in software; a module may be implemented in software, hardware/circuitry, or a combination of software and hardware.

In the present disclosure, a computer system may comprise a very small microcontroller system. A microcontroller may comprise a single integrated circuit that contains the four main components that create a computer system: an arithmetic and logic unit (ALU), a control unit, a memory system, and an input and output system (collectively termed I/O). Microcontrollers are very small and inexpensive integrated circuits that are very often used in digital electronic devices.

Multiple-LED Control System Overview

To control multiple Light Emitting Diodes (LEDs), or any other controllable light source, the present disclosure introduces a single-wire multiple-LED power and control system. Specifically, individually controlled LED units are arranged in a series configuration that is driven by a head-end control unit located at the head of the series. The series of separate individually controlled LED units may be referred to as a "line" or "string" of lighting devices and the head-end control unit for the series may be referred to as the "line driver" or "string driver" since the head-end control unit provides the electrical power and control signals to drive all of the individually controlled LED units on the line or string. Although the present disclosure is focused on controlling LEDs or other light sources, the teachings of the present disclosure may be used to control any other type of electronic device such as sound systems, motors, sensors, cameras, Liquid Crystal Displays (LCDs), etc.

FIG. 2A illustrates a block diagram of the overall architecture of the single-wire multiple-LED unit control system of the present disclosure. A LED line driver circuit 220 is situated at the head of a series of individually controlled LED units (250-1 to 250-N). In the example embodiment of FIG. 2A, the LED line driver circuit 220 receives electrical power from an external power supply circuit 210 that will be described in detail later in this document. The LED line driver circuit 220 also receives LED control data from a master LED controller system 230. (Note that although this document will refer to an 'LED line driver circuit', the line driver circuit can be used to send power and data to other types of circuits coupled to the driver line that perform operations other than controlling LEDs.)

The master LED controller system 230 provides detailed control data describing how the various LEDs on the individually controlled LED units (250-1 to 250-N) on the string should be powered on or off and the brightness of each powered on LED. (In one embodiment, each individually controlled LED unit has multiple LEDs of different colors such that the LED controller system 230 only supplies a color value and a brightness.) The master LED controller system 230 can be any type of digital electronic system that provides LED control data in the appropriate format to the LED line driver circuit 220.

The master LED controller system 230 may range from a simple single chip microcontroller to a sophisticated computer system that drives many LED strings in a coordinated manner. For example, in a relatively simple embodiment, the parts of a microcontroller implemented master LED controller system 230, the power supply 210, and the LED line driver 220 may be combined into a single LED Driver System 239 that controls a string of LED units 250. In a more sophisticated embodiment, an external computer system, such as computer system 100 illustrated in FIG. 1, can be programmed to output an appropriate LED control data signal to the LED line driver circuit 220 using signal generation device 118 or any other appropriate data output system.

In one particular embodiment, the well-known Serial Peripheral Interface (SPI) is used to provide LED control data 231 from the master LED controller system 230 to the LED line driver circuit 220. In this manner, many LED strings can be coupled to and controlled by a single master LED controller system 230 such as computer system 100. However, in alternate embodiments any other appropriate digital communication system such as the Universal Serial Bus (USB), Ethernet, or the IEEE 1394 interface (FireWire) may be used to provide LED control data to the LED line driver circuit 220. In an embodiment geared toward stage lighting applications, the data interface may be programmed to handle the well-known DMX512-A protocol used for controlling stage lighting. In such an embodiment, multiple LED line driver devices can be coupled in a daisy-chain arrangement for controlling multiple strings of independently controlled LED units.

Using the power received from the power supply 210 and the LED control data 231 from the master LED controller system 230, the LED line driver circuit 220 drives an electrical signal on a current loop (made up of line starting at 221 and returning at 229) that provides both electrical power and control data to the entire string of the individually controlled LED units (250-1 to 250-N). This system of providing both power and control data on a single wire greatly simplifies the design and construction of LED lighting and display systems. Furthermore, the use of a single wire to carry both power and control data significantly reduces the cost of constructing such a multiple LED display or lighting system. With the disclosed system, the single current loop (also referred to as the driver line) may serve seven or more different functions for the individually controlled LED units on the string such as: (1) electrical power for the LED units 250, (2) control and configuration commands to LED units, (3) LED output data, (4) a clock reference value used to generate a local clock signal, (5) a current reference value used to calibrate current output to LEDs, (6) heat dissipation, and (7) physical structure for supporting the individually controlled LED units (250-1 to 250-N). Details on each of the functions will be provided in later sections of this document.

Figure 2B:
FIG. 2B illustrates an example data packet that may be sent to LED units.

FIG. 2B illustrates one embodiment of a data frame that may be modulated onto the driver line linking the individually controlled LED units (250-1 to 250-N). At the head of the data frame is a synchronization byte 291. Since there is no separate clock signal sent to the LED units 250, the synchronization byte is used by the LED units 250 to help lock onto the digital data signal and determine where each new data frame begins. Next, a command field 292 specifies a particular command to be executed by the recipient LED unit 250. An address field 293 specifies a specific address (or group of addresses) to select which of the LED units (250-1 to 250-N) will respond to the command. After the address field 293 is a data field 294 that contains a payload of data. Finally, an optional Cyclic Redundancy Check (CRC) code 295 may be used to help ensure data integrity.

Referring back to FIG. 2A, a number of individually controlled LED units (250-1 to 250-N) are coupled to the driver line (that starts at 221 and returns at 229) of the LED line driver circuit 220 in a series arrangement. Each individually controlled LED unit 250 comprises one or more LEDs, a LED controller circuit, and any additional components needed to complete the individually controlled LED unit 250. In one embodiment, the only additional electrical component needed is a capacitor to store a reservoir of power for driving the LEDs on the individually controlled LED unit 250. In other embodiments that handle greater amounts of electrical current, an external diode and a small heat sink may be used in addition to the capacitor used to store operating power. When there are more than one LED coupled to an individually controlled LED unit 250, each different LED on that LED unit 250 is referred to as a LED 'channel' on that LED unit 250.

In some embodiments, more than one capacitor may be used to store power to operate the individually controlled LED unit 250. For example, in one embodiment, there are different capacitors used to store power for different LEDs. This may be done since different colored LEDs operate at different voltage levels and by matching up capacitors with each different colored LED, the capacitors can be used to store just the right amount of voltage needed to drive that particular colored LED. In this manner, LEDs that needed higher voltage amounts are given those higher voltage amounts but LEDs that need lower voltage amounts are given those proper lower voltages. This prevents the inefficient use of a voltage dropping circuit that would simply burn off excess voltage as wasted heat.

A critical component on each of the individually controlled LED units (250-1 to 250-N) is a LED controller circuit. The LED controller circuit performs most of tasks required to intelligently control the various LEDs on an individually controlled LED unit 250. These tasks include obtaining power from the diver line and storing that power in supply capacitor used to power the LED unit, generating the required regulated voltages to power the LED controller circuit, demodulating a data signal modulated onto the current, decoding the demodulated data signal to extract a data frame, executing commands received in the data frame, and driving the various LEDs to the specified brightness level. Details on each of these functions will be presented in the section on the individually controlled LED unit.

The LED Line Driver

As set forth in the previous section, the LED line driver circuit 220 of FIG. 2A is responsible for providing both electrical power and LED control data to all of the individually controlled LED units (250-1 to 250-N) coupled in series to the LED line driver circuit 220 on the driver line that starts at 221 and returns at 229. To make LED lighting and display systems simple and inexpensive to construct, the LED line driver circuit 220 provides both electrical power and control data to all of the LED units 250 on the single driver line. This single-wire driver line greatly simplifies the construction of lighting and display systems that use large numbers of individually controllable lighting elements since those individually controllable lighting elements may be arranged in a simple daisy chain arrangement with a single wire coupling together each lighting element.

To provide power to the individually controlled LED units 250, the LED line driver circuit 220 functions as an electrical current source that drives a nominally constant direct current (DC) signal on the single driver line. Each of the individually controlled LED units (250-1 to 250-N) coupled to the driver line in a series arrangement will draw needed operating power from the nominally constant current driven on the driver line.

Figure 3:
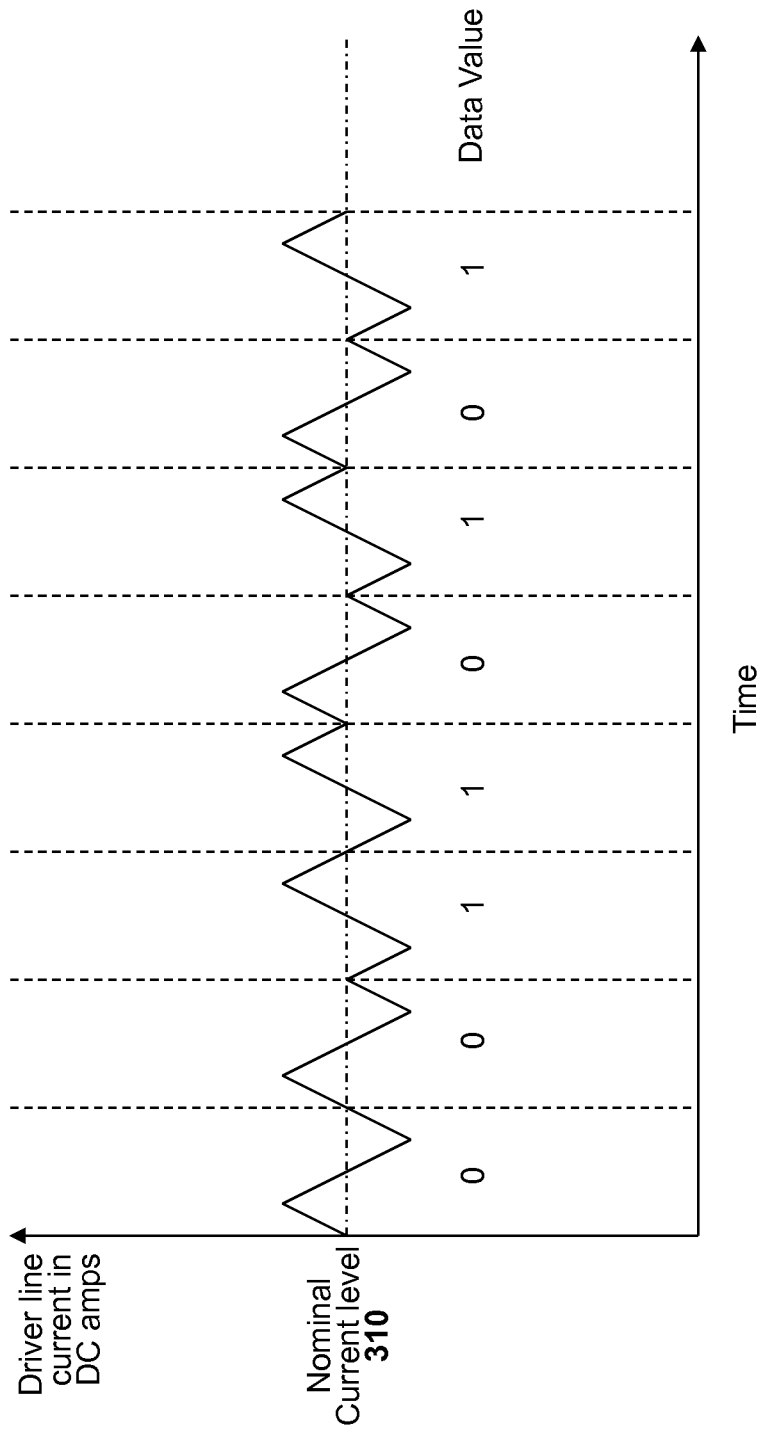
FIG. 3 illustrates a timing diagram that shows show digital information may be modulated as current deviations from a nominal current value.

To provide LED control data to all of the individually controlled LED units 250 on the string, the LED line driver circuit 220 modulates control data onto the electrical current driven on the driver line. In one embodiment, the control data is modulated onto the electrical current with small up and down spikes from the nominal constant current value. In such an embodiment, each data phase may be broken up into 2 cycles comprising either a positive spike of current followed by a negative spike of current or a negative current spike followed by a positive current spike. These two different data phase patterns are used to represent a one ("1") or a zero ("0") for a digital communication system. FIG. 3 illustrates an example current diagram graphically depicting the current on the single driver line controlled by the LED line driver circuit 220 as data is modulated onto the electrical current. In the example of FIG. 3, a local zero ("0") is represented by a positive spike of current followed by a negative spike of current and a one ("1") is represented by a negative current spike followed by a positive current spike. Note that each data phase contains both a positive current spike and a negative current spike such that average current value on the line remains at a constant nominal current amount.

Other means of coding the data include using Manchester coding and Non-Return-To-Zero with Manchester. Other means of modulating data onto an electrical current may also be used. For example, in one alternate embodiment a first electrical current level may be used to designate a logical zero ("0") and a second electrical current level may be used designate a logical one ("1"). In this manner, a stream of data bits may be encoded by switching between the two electrical current levels.

Figure 4:
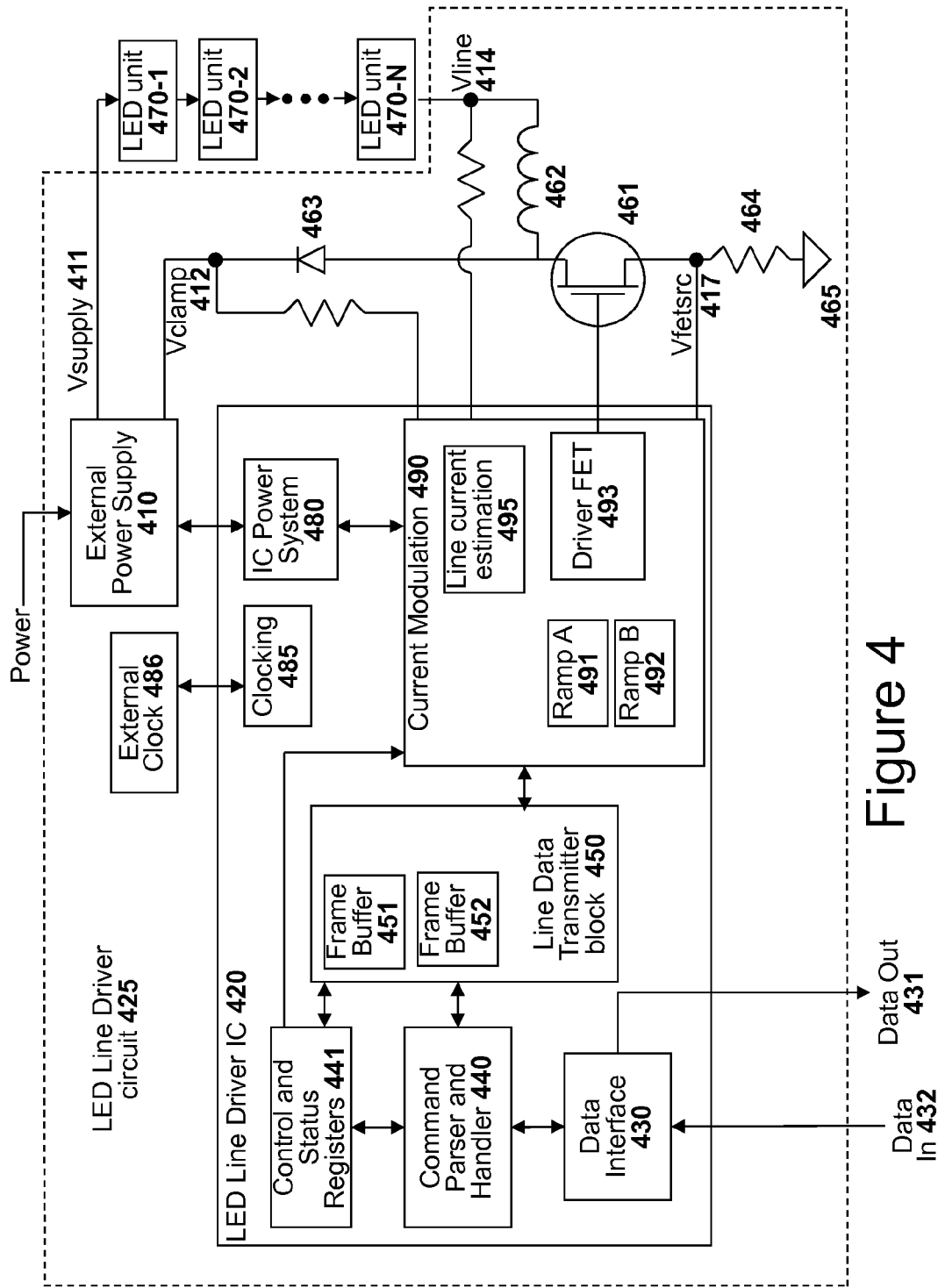
FIG. 4 illustrates the circuits of a LED line driver circuit in one embodiment.

FIG. 4 illustrates a block diagram of the internals of a LED Line Driver circuit 425 in one particular embodiment. The main aspect of the LED Line Driver circuit 425 is a LED Line Driver IC (integrated circuit) 420 that controls the overall operation of the LED Line Driver circuit 425. The LED line driver IC 420 includes a clocking circuitry block 485 to generate the needed clock signals for driving the digital circuitry. The clocking circuitry block 485 may receive input from an external clock 486 (or resonator) to generate the various needed internal clock signals. The clocking circuitry block 485 may contain a prescaler for reducing the speed of the clock signal from external clock 486 for the internal core clock generation, some synchronization logic to ensure that the chip's clocks properly start up after a power reset, and a timing generator for sending the modulating data onto the driver line with the proper data rate.

Referring to the bottom left of the LED Line Driver IC 420 of FIG. 4, a data interface 430 receives control data from an outside controller such as the master LED controller system 230 illustrated in FIG. 2A. The data interface 430 extracts the incoming control data and passes that control data to a command parser and handler circuit 440. In a simple embodiment, the LED Line Driver IC 420 itself may include the circuitry for generating a pattern of LED control data such that no external LED controller is required.

In one particular embodiment, the data interface 430 implements the well-known Serial Peripheral Interface (SPI) protocol. In such an embodiment, the implementation may include the standard Data In 432, Data Out 431, Data Clock (not shown), and Chip Select (not shown) pins typically used by the Serial Peripheral Interface (SPI) protocol. The operation of the SPI system will vary depending on the particular implementation. In a traditional SPI implementation, an external SPI master (such as master LED controller system 230 of FIG. 2A) sends data to the Data In 432 pin on each LED line driver IC 420 and specifies which LED line driver circuit(s) should act upon the data by activating the Chip Select Pins on their respective LED line driver IC(s). The SPI protocol is a two-way protocol such that individual LED line driver circuits can send back status information to the external SPI master system. One embodiment of the LED line driver circuit uses the return data path to return responses to status queries such as requests for calibration information and buffer status. In an alternate implementation of the SPI protocol, the Data Out 431 line could be coupled to the Data In interface on another LED line driver circuit in a daisy-chain arrangement such that a series of LED line driver circuits could be controlled by a single master LED controller system.

The Command Parser and Handler circuit 440 examines the incoming control data and reacts to the incoming control data appropriately. In one embodiment, the LED Line driver IC 420 handles three main types of incoming commands: configuration requests, status requests, and requests to pass data down the driver line to the individually controlled LED units coupled to the driver line. Configuration requests may instruct the LED Line driver IC 420 to set specified control registers in the Control and Status Registers block 441. Configuration requests may also instruct the LED Line driver IC 420 to burn non-volatile configuration fuses on the LED Line driver IC 420 such that permanent configuration information may be programmed onto the LED Line driver IC 420. Incoming status requests may request status information from the LED Line driver IC 420 such as its buffer status, operating status, and current configuration. Such status requests sent to the LED Line driver IC 420 may be handled by fetching information from the Control and Status Registers 441 and transmitting a response back to the master controller on the data out line 431.

Requests sent from a master LED controller to the LED Line driver IC 420 to pass LED control data down the driver line to the individually controlled LED units will generally make up the majority of the communication to LED Line driver ICs. The Command Parser and Handler circuit 440 will handle these LED control data passing requests by passing the LED control data to a Line Data Transmitter Block 450. The Line Data Transmitter Block 450 stores the control data into a frame buffer. In the embodiment of FIG. 4, the LED Line driver IC 420 contains two frame buffers (451 and 452) such that the LED Line driver IC 420 may receive incoming LED control data from the master LED controller into a first frame buffer while simultaneously modulating LED control data from the second frame buffer onto the driver line. The frame buffers (451 and 452) temporarily store LED control data destined for one or more individually controlled LED units (470-1 to 470-N) coupled to the driver line.

In some embodiments, the LED units 470 may communicate back to the LED Line driver IC 420. For example, a LED unit 470 may be able to signal back to the LED Line driver IC 420 by turning its shunt transistor on and off during a designated time slot such that the effect would be detectable by the LED Line driver IC 420. In such embodiments, an incoming status request message on Data In 432 may request status from individually controlled LED units 470 coupled to the driver line. The Command Parser and Handler circuit 440 would then translate this LED unit status request into a second status request message that is then given to the Line Data Transmitter Block 450 and modulated onto the driver line. When a response is received from the LED unit 470 the LED Line driver IC 420 may then send a corresponding response message on the data out line 431.

The Line Data Transmitter Block 450 is responsible for transmitting LED control data (and status requests in some embodiments) onto the driver line to the LED units 470. The Line Data Transmitter Block 450 takes the control data (or status request) passed to it from the Command Parser and Handler circuit 440 and fills the next available frame buffer. In one embodiment, the Line Data Transmitter Block 450 block is capable of calculating an optional frame Cyclic Redundancy Check (CRC) byte if a control register 441 specifies that this should be done. In one embodiment, when the Line Data Transmitter Block 450 has no pending LED control data (or status) to modulate onto the driver line, then the Line Data Transmitter Block 450 will modulate an idle data frame onto the driver line. The idle data frame will be ignored by all of the individually controlled LED units 470 but will help those individually controlled LED units 470 maintain synchronization with the data stream being modulated onto the driver line.

The Line Data Transmitter Block 450 passes formatted data frames from the frame buffers (451 and 452) to the Current Modulation Block 490. The Current Modulation Block 490 is responsible for modulating a (nominally) constant direct current signal on the driver line to provide a stream of data to the LED units 470 on the driver line. Specifically, the Current Modulation Block 490 modulates the electrical current by inducing small sharp increases and decreases of the electrical current in order to transmit LED control data down the driver line to control the LED units 470. In one embodiment, the Current Modulation Block 490 accomplishes this goal by controlling an external transistor that biases an inductor on the driver line.

Before discussing the Current Modulation Block 490 in greater detail, a review of electrical power sources is useful. Most electronic circuits are constructed using a voltage power source as an electrical power source to power the electronic circuits. An ideal voltage source is a conceptual mathematical model that is capable of generating infinite current at a particular designated voltage level to drive a load circuit and has zero internal resistance. Of course real world voltage sources, such as batteries and DC power supplies, are unable to generate infinite current and have non zero internal resistance. However, as long as the load circuit powered by a real world voltage source does not exceed the current capacity of the real world voltage source and a non zero internal resistance is added in series with load circuit, an ideal voltage source can be used for circuit modelling a voltage source.

A current source is a much lesser used method for modelling an electrical power source when designing electronic circuits. An ideal current source is a mathematical model of an electrical power source that is capable of generating infinite voltage at a specified current level to drive a load circuit and has infinite internal resistance. Again, no real world current source is capable of providing infinite voltage nor will it have infinite resistance. But as long as the load circuit driven by a real world current source does not have too high of a total resistance that would require very high voltage values, a real world current source can be modelled as an ideal current source with a non infinite internal resistance in parallel with the ideal current source (a circuit known as the Norton equivalent circuit). The present disclosure uses a current source as the power source model. Specifically, the Current Modulation Block 490 of the LED line driver IC 420 and the supporting external circuitry keep the electrical current on the driver line around a specific nominal current value with small increases and decreases of current away that nominal current value used to modulate data onto the electrical current.

Referring back to FIG. 4, an external power supply 410 generates electrical current that is transmitted down a driver line through the LED units 470. The output voltage (labeled as Vsupply 411) of the external power supply 410 at the head of the driver line is at a voltage potential above what is needed by the sum of all the LED units 470 on the driver line. After all of the LED units 470 on a string, the current passes through an inductor 462 and a field effect transistor (FET) 461 to ground. The Current Modulation block 490 carefully modulates the current level on the driver line by controlling the inductor 462 using FET 461. Note that the FET 461 will generally be implemented externally from the LED line driver IC 420 since the FET 461 must be able to handle relatively high voltage potentials that cannot be handled within an ordinary CMOS semiconductor.

Figure 5B:
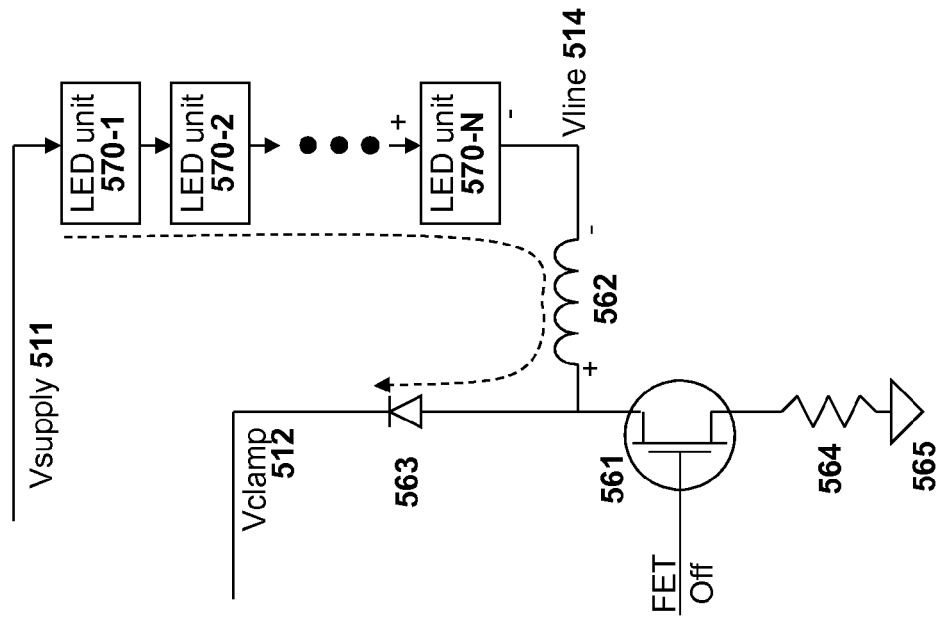
FIG. 5B illustrates how having the LED line driver turning off an external field effect transistor allows the line current to ramp downward.
Figure 5A:
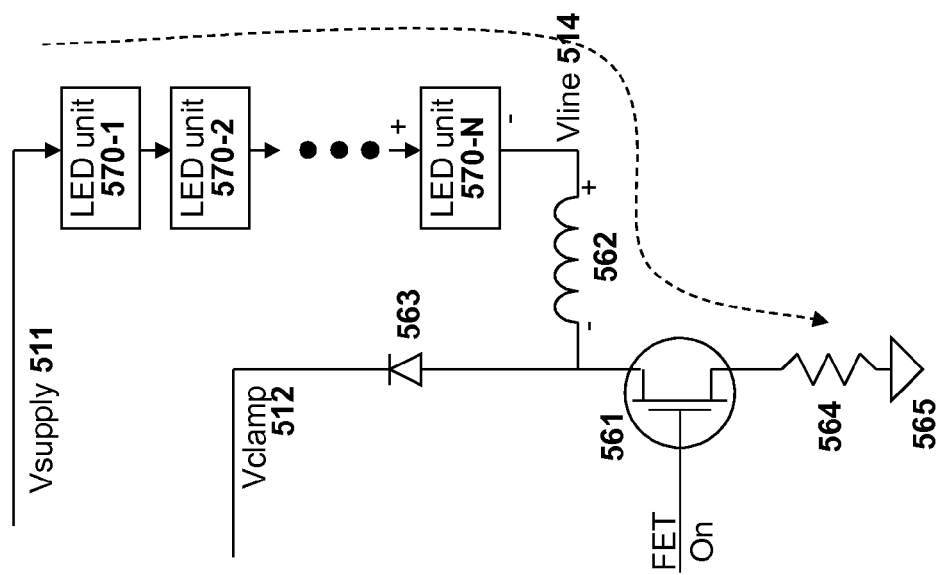
FIG. 5A illustrates how having the LED line driver turning on an external field effect transistor allows the line current to ramp upward.
Figure 5C:
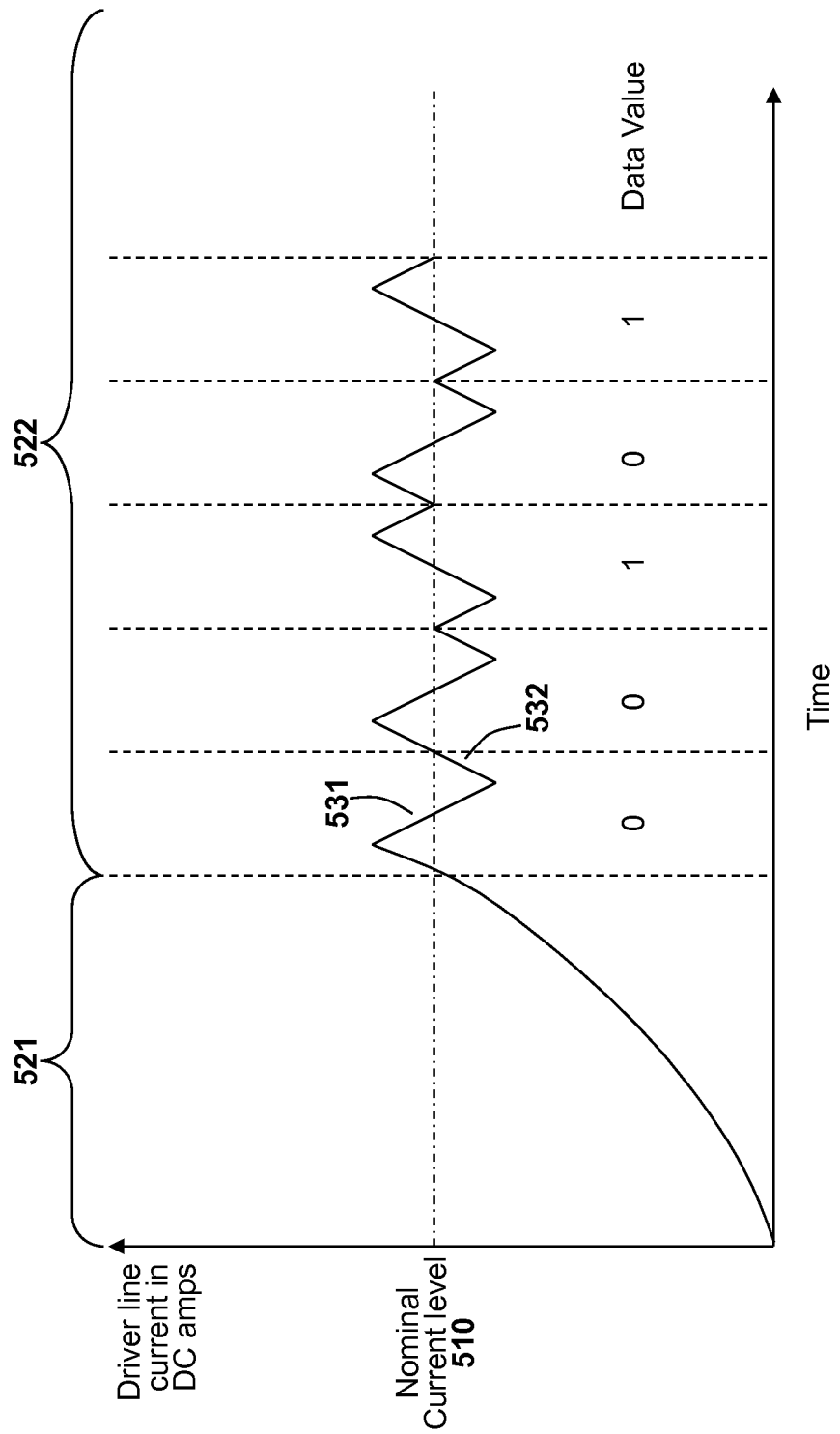
FIG. 5C illustrates a current diagram of current modulated by the circuit of FIGS. 5A and 5B.

Referring back to current diagram of FIG. 3, the current on the driver line is modulated around a nominal constant current value 310 with small up and down current variations above and below the nominal constant current value 310 used to modulate data onto the driver line. FIGS. 5A, 5B, and 5C illustrate how the LED line driver controls inductor 562 using FET 561 to modulate the current around the designated nominal current value 310. Note that current control circuits other than a FET may be used instead.

In a steady state direct current (DC) circuit, an inductor acts as a short circuit with no effect on the circuit. However, when in a state of change, an inductor resists current level changes. Thus, when current passing through an inductor is being increased, that inductor will slow the increase of current by storing energy in a magnetic field. Similarly, when current passing through an inductor is being decreased, that inductor will resist the decrease in current by using the energy stored in the magnetic field to supplement the slowing current.

Referring to FIG. 5A, when a LED line driver 425 is initially turned on, that LED line driver will turn on FET 561 to allow electrical current to flow from Vsupply 511 down through all the LED units 570 on the string, through inductor 562, through FET 561 (which controls the current), and finally through resistor 564 to ground 565 of the power supply. This electrical path from the Vsupply 511 of the external power supply to the ground 565 of the external power supply is referred to as the current loop. Note that after inductor 562 there is a circuit branch that passes through diode 563 to a second voltage source Vclamp 512 from external power supply. However, current will not flow towards Vclamp 512 when the FET 561 is turned on since Vclamp 512 will be at a voltage potential higher than ground 565.

When FET 561 is initially turned on, the electrical current will increase on the driver as illustrated in FIG. 5C. However, the increase in electrical current will be slowed by inductor 562 that will resist a rapid current increase by storing energy in a magnetic field. Thus, the current on the driver line will ramp upwards during a start-up phase 521 in FIG. 5C. Note that there will be voltage drop across the inductor 562 during this time as indicated by the "+" and "−" symbols on FIG. 5A. The LED line driver IC 420 will keep the FET 561 turned on during start-up phase 521 thus allowing the current level on the driver line to increase until the current exceeds the designated nominal current level 510 by a specified amount.

Once the current flowing on the driver line exceeds the designated nominal current level 510 by a specified amount, the LED line driver IC 420 will turn off FET 561 as depicted FIG. 5B such that the current can no longer flow through FET 561 toward the ground 565 of the power supply. However, the inductor 562 will resist a rapid change in current flow and instead cause the current to begin ramping downward as illustrated by current drop 531 in FIG. 5C. Since the current can no longer flow through FET 561 to ground 565, the slowing current will instead flow in the branch circuit through diode 563 toward Vclamp 512 as illustrated in FIG. 5B which depicts the flow of current when the FET 561 has been turned off. This will occur even though Vclamp 512 is at a higher voltage than Vsupply 511 since inductor 562 will use energy in its magnetic field to continue driving the current.

Although the current will begin to ramp downward just due to the fact that the FET 561 has been turned off, a downward ramp due only to turning off the FET 561 would be relatively slow. (Slow relative to the upward ramping of current when the FET 561 is turned on, thus creating an asymmetry between the up and down current ramps.) To accelerate the downward ramping of current and thus cause the upward and downward current ramps to approximately match, Vclamp 512 is set to a higher voltage potential than Vsupply 511 such that a reverse voltage bias (as indicated by the "+" and "−" symbols in FIG. 5B) will be placed across inductor 562 thus accelerating the ramp down of current.

Referring to FIG. 5C, once the current 531 drops more than a specified amount below the designated nominal current value 510, the LED line driver will turn on the FET 561 (reverting back to the state of FIG. 5A) to allow the current to ramp back upward as illustrated by current rise 532. The LED line driver IC 420 does not allow the current on the driver line to reach a final steady state of direct current. Instead, it will continually turn the FET 561 on and off to keep the current on the driver line around the desired nominal current level 510.

In an alternate embodiment, more than one inductor and FET pair may be coupled in parallel to the driver line. In this manner, the parallel inductors can provide more current change resistance with low voltage amount across the parallel inductors.

By turning the FET 561 on and off, the LED line driver IC 420 can modulate the amount of current flowing on the driver line in relatively steady upward and downward ramps. By turning the FET 561 on and off in a manner correlated with control data, the LED line driver IC 420 can modulate control data as current patterns on the driver line as illustrated by the data phase 522 of FIG. 5C. Note that when a LED line driver IC 420 lacks any commands that it needs to modulate onto the driver line, then LED line driver IC 420 will then modulate empty packets onto the driver line. In this manner, various LED units on the driver line will be able to maintain synchronization with the data stream modulated by the LED line driver IC 420.

Referring back to FIG. 4, the current modulation block 490 receives data frames from the Line Data Transmitter Block 450 to modulate onto the driver line as patterns of current spikes. As set forth above, the Current Modulation block 490 may accomplish this task by either turning on external FET 461 (which allows current to ramp upward by allowing the current to pass to the ground 465 of the power supply 410) or turning off external FET 461 (which ramps current downward by applying a reverse bias across inductor 462). The Current Modulation block 490 is responsible for ensuring that despite the current changes induced onto the driver line to modulate data, the current averages out to a proper desired nominal direct current (DC) level. In this manner, the average current level on the driver line may be used as a current reference value by the LED units coupled to the driver line.

The Current Modulation block 490 may control the external FET 461 by controlling its own internal FET 493. In one embodiment, the internal FET 493 is designed to handle 10 volt swings in order to be able to control the larger external FET 461 that is directly responsible for controlling the current on the driver line.

The modulation of data onto the current is not a trivial process. The operation of the various LED units 470 on the driver line will make it difficult for the LED line driver circuit 425 to consistently control the electrical current on the driver line. Specifically, referring to FIG. 5A, the various LED units 570 will either be drawing current to charge a local capacitor (which causes a larger voltage drop across the LED unit) or shunting the line current (which causes only a small voltage drop across the LED unit) such that the voltage drop between Vsupply 511 and Vline 514 will vary depending on whether the LED units are shunting or not. As a consequence, the voltage across inductor 562 will also vary such that the upward ramp of current (when the FET 561 is on) will not always be at the exact same slope. The same issue applies during downward ramps of current. Specifically, referring to FIG. 5B, the varying voltage drop across LED units 570 means that the reverse voltage bias from Vclamp 512 across the inductor to Vline 514 will not always be the same such that the slope of downward current ramps will vary. To reduce this issue, the various LED units 570 should restrict their unshunting to times near the edge of the data bits. However, the shunting and unshunting by the LED units 570 near the data bit edges will still affect the task of modulating and demodulating data.

Ideally, the LED line driver 425 would generate current ramps that always begin and end at the nominal current value 610 and are perfectly symmetrical during each half of a bit cycle and as illustrated by the ideal current ramp drawn with a dashed line on FIG. 6A. However, the varying conditions on the driver line will prevent such ideal current ramps from always being achieved. For example, if there is a relatively low voltage drop across the cumulative LED units 570 on the driver line then a higher voltage across inductor 562 may cause the current to increase faster (as illustrated by the solid line) than the ideal current ramp (as illustrated by the dashed line) in FIG. 6A. (Note that the exact height of the peak of a current ramp is not so important as long as it is larger than threshold amount needed to be detectable.)

To compensate, the downward current ramp should begin should begin at an appropriate time (determined by taking into account the anticipated downward slope) such that the current level crosses the nominal current level 610 in the middle of the data cycle. In the example of FIG. 6A, it is anticipated that the downward current slope will be less steep than the ideal such that the downward phase begins earlier than normal thus producing a slightly left-shifted peak of the current ramp. In general, if the absolute value of the slope during the first part of a ramp is greater than the absolute value of the slope during the second part of a ramp then the peak will be shifted earlier (to the left on a timeline diagram) and if the absolute value of the slope during the first part of a ramp is less than the absolute value of the slope during the second part of a ramp then the peak will be shifted later (to the right on a timeline diagram).

To carefully create the current ramps, the current modulation block 490 of the LED line driver circuit 425 may create models of the current behavior to estimate the proper time to change the external FET 461. Various different methods may be used to model the current ramps. In one particular implementation, the Current Modulation block 490 uses analog computers to model the current ramps in order to determine when to turn the FET on and off.

Referring to FIG. 4, the Current Modulation block 490 has two substantially identical analog computer circuits labelled as Ramp A 491 and Ramp B 492. The Current Modulation block 490 uses these two analog computer circuits in an alternating manner wherein one analog computer is used during the first half of a data cycle and the other analog computer is used during the second half of a data cycle. Each of the two analog computer circuits uses an analog ramp circuit to estimate when to turn on or off the gate signal of the field effect transistor (FET) 493 (which will in effect turn on or off the larger external transistor 461) to have the current ramp end up back at the nominal line current value at the end of the half of a bit cycle. In one embodiment, these analog ramp circuits build a model of how much the current would change during the remainder of the half of a bit cycle if the FET 493 were immediately switched. In the case of an upward ramp, the model specifies the how much the current would drop from its present amount if the FET 493 were immediately switched. This will vary from a large amount of current drop if the FET 493 were switched at the start of a half of a bit cycle to zero current change if the FET 493 were switched at the end of the half of a bit cycle.

As set forth earlier, the speed at which the current changes is dependent upon the voltage across the inductor 462. To determine the voltage across inductor 462, three different voltage values are provided to the current modulation circuit 490: Vline 414, Vclamp 412, and Vfetsrc 417. When the FET 461 is turned on, the voltage across inductor 462 is determined as the voltage difference from Vline 414 to Vfetsrc 417 (minus a small drop across FET 461). When the FET 461 is turned off, the voltage across inductor 462 may be determined as the voltage difference from Vline 414 to Vclamp 412 (minus a small drop across diode 463). Using these voltage values, the rate of the current change (as depicted by the slope) can be estimated and used to determine the proper time to switch the FET 461. Note that these voltage values may actually be read as current through a resistor, however, the current is proportional to the voltage as per Ohm's law.

The analog computer circuits (Ramp A 491 and Ramp B 492) may be implemented with a ramp circuit and a multiplier circuit. A ramp circuit is used to generate a ramp signal that starts at a fixed full scale value and ramps down to zero at the end of the half of a bit cycle. This ramp signal is then multiplied in an analog multiplier circuit by the voltage difference value that determines the rate of the current change (graphically illustrated as the slope). If the FET 493 is currently turned on then the ramp signal is multiplied by an amount correlated to Vclamp 412-Vline 414 since this will be the voltage across the inductor 462 once the FET 493 is turned off. If the FET 493 is currently off then the ramp signal is multiplied by an amount correlated to Vfetsrc 417-Vline 414 since this will be the voltage across the inductor 462 once the FET 493 is turned back on.

The output of an analog ramp circuit is combined with the present time value of the electrical current on the driver line (or an estimate of that current). When the absolute value of present current difference the nominal current level equals the amount of the current change that will occur as predicted by the ramp circuit, the state of the FET 461 is changed. The electrical current on the driver line when the FET 461 is turned on can be determined from the Vfetsrc 417 voltage value since the current on the driver line will equal the Vfetsrc 417 voltage divided by the resistance of resistor 464 as per Ohm's law. However, when the FET 461 is turned off, a line current estimation circuit 495 can be used to estimate the electrical current on the driver line when the FET 461 is off using the last known current value and the voltage across the inductor 462 as determined by Vline 414 and Vclamp 412.

To best describe the operation of the ramp circuits, some examples are hereby provided with reference to FIG. 6B. At the start of a data cycle, one of the ramp circuits is charged up and multiplied by the voltage difference across the inductor to generate a value that corresponds to the amount of a current change that would occur if the FET 493 were immediately switched. This amount of current change will drop down to zero (assuming it was charged properly) at the end of the half of the bit cycle. This is conceptually illustrated in FIG. 6B as lines 651, 652, and 653 that have been drawn for different voltage values across the inductor. Each line starts at a maximum current drop amount relative to the nominal current level 610 if the FET were switched immediately and drops down to zero current change at point 691 at the end of the half of the bit cycle. The slope of the different lines 651, 652, and 653 indicate how fast the current is expected to change based upon the voltage across the inductor.

To use the output of the analog computers, the present current value (relative to the nominal current level 610) is compared with the current drop that is predicted to occur during the remainder of the half of the bit cycle by the ramp circuit. When the present current value crosses the predicted amount of current drop, the FET 493 is switched. In the diagram of 6B, three different examples are presented. In a first example, the current increase 661 is faster than the predicted current drop rate 651 such that the system must switch the FET 493 before the midpoint 631 thus causing the peak of the current ramp to be slightly shifted to the left. Note that both the current rise rate and the current fall rate are both affected by the voltage across the inductor such that each different example current rise rate will have a different predicted current fall rate. In another example, the current increase 663 is slower than the predicted current drop rate 653 such that the system must switch the FET 493 after the midpoint 631 thus causing the peak of the current ramp to be slightly shifted to the right. When the current increase rate 662 substantially equals the predicted current decrease rate 652, the ideal ramp centered at the midpoint 631 will be created. However, as long as the current ramps peak within a reasonable distance of the midpoint 631, the demodulation logic will have no problem identifying the current ramps properly.

As previously set forth, when the FET 493 is off, it is difficult to determine the current passing through the driver line since the current is temporarily being diverted towards Vclamp 512 as illustrated in FIG. 5. Thus, the technique of determining the current by measuring the voltage at Vfetsrc 417 in FIG. 4 cannot be used since no current is passing through resistor 464 to generate voltage. Instead, another ramp circuit, line current estimation circuit 495, may be used to estimate the current during downward ramps. Thus, referring back to FIG. 6B, line current estimation circuit 495 may be used to predict the current on the driver line as illustrated by prediction line 680. Note that the rate of current change will again be correlated with the voltage drop across the inductor. Similarly, one of the ramp circuits (491 or 492) will be used to predict the amount that the current will rise for the remainder of the half of the bit cycle if the FET 493 were immediately switched. When the two prediction circuits are outputting equal absolute values (relative to the nominal line current) the FET 493 is switched.

The internal logic of the current modulation block 490 may be implemented in various different ways. In one embodiment, the system digitally determines the current in the line when the FET 493 is on using the Vfetsrc 417 voltage measurement. Then a digital-to-analog converter (DAC) converts this digital current value to an analog current value to compare with the predicted analog current drop value output by an Analog Ramp generator (491 or 492). When the two values are equal, the system switches FET 493 (which will in effect turn on or off the larger external transistor 461).

Referring to FIG. 6C, a full data cycle comprising an upward current spike followed by a downward current spike is illustrated. During time period 620, one of the analog ramp circuits (such as Ramp A 491) is charged up to help determine the transition time. At time 621, the FET 461 is turned on (if it was not already on) to begin the current increase and the charged analog Ramp A circuit 491 is started (to generate a representation of how much the current will drop when the FET is switched off). During time period 622, the electrical current on the driver line (as calculated from Vfetsrc 417 voltage value) is compared with output of the analog Ramp A circuit 491 that predicts how much the current will drop during the remainder of the half of a bit cycle if the FET 493 is switched off. When the two values are substantially equal (within a threshold value of each other) then the Current Modulation block 490 turns the FET 461 to allow the electrical current level to drop back down to the nominal current value 610 during time period 624.

The time at which the system may determine that the state of the FET 461 should be changed and the time at which the effects of the change are detectable at FET 461 will not be equal due to propagation delays. Specifically, there are delays in the comparison circuit, there is a delay as the internal driver FET 493 is activated, and there is a delay as the external FET 461 is activated. To compensate for these propagation delays, an adjustment factor may be used to have the ramp circuit (491 or 492) make the request to change the FET state slightly before the two values are equal. In one embodiment, this may be implemented by applying a fixed offset to the input of the comparator circuit that results in having the comparator fire earlier. Thus, the system will change the state of the FET when the two values (the current value and the predicted current drop value) become within a defined threshold amount of each other. In this manner, the FET will be switched a little bit earlier than the exact time when the two values (the line current and the predicted current drop) actually cross. A closed loop system may be employed to determine the proper value for the fixed offset adjustment to the comparator.

During time period 624, the current on the driver line will drop back down toward the nominal current value 610. If the system accurately predicted the behavior of the electrical current then the electrical current level will pass through the nominal current value 610 at the midpoint 625 of the data bit cycle. During the fall time period 624, the Current Modulation block 490 will charge the other analog ramp circuit (such as Ramp B 492 since Ramp A 491 was using during the first half of the data cycle) to estimate the amount the current would rise if the FET 493 were switched back on. And in an embodiment wherein the current on the driver line is predicted instead of measured during downward current ramps, the system also charges up the line current estimation circuit 495 for predicting the current level prediction as it drops.

At data cycle midpoint 625, the charged analog Ramp B circuit 492 and the charged line current estimation circuit 495 are started. In addition, the current level at the data cycle midpoint 625 may be sampled to see if the system properly determined the transition time (in the previous half of a bit cycle) needed to return the current level back to the nominal current level 610. If no current sample is available, then final output of the ramp circuit at the data bit cycle midpoint 625 may be tested. If the (real or predicted) current level at the midpoint 625 was below the nominal current level 610 then the parameters for using the analog Ramp A circuit may be adjusted to make it less aggressive (reduce the predicted rate at which the current will drop). On the other hand, if the (real or predicted) current level at the midpoint 625 was above the nominal current level 610 then the parameters for using the analog Ramp A circuit will be adjusted to make it more aggressive (increase the predicted rate at which the current will drop).

During phase 626 in the second half of the data cycle, the estimated current level on the driver line (as estimated using line current estimation circuit 495) is compared with the analog Ramp B circuit 492 output that predicts how much the current will rise during the remainder of the half of a bit cycle if the FET 493 is immediately turned on. When the comparison is within a specified threshold at point 627, the FET 493 is turned off to allow the current level to begin rising. Again, a propagation delay adjustment factor (such as the threshold value) may be used to make the request to turn on the FET 493 occur slightly before the two values are equal. After the FET 493 has been turned back on, the current level will rise during time period 628 until the end of the data cycle is reached at point 629. During time period 628, the current modulation circuit 490 will charge up the other analog ramp circuit (Ramp A 491 in this example) for use in the next data cycle.

At the endpoint 629 of the data cycle, the current modulation circuit 490 will sample the current level to determine if the system properly estimated the transition time in order to return the current level back to the nominal current level 610. If the current level at the endpoint 629 was below the nominal current level 610 then the parameters for using the analog Ramp B circuit will be adjusted to make it more aggressive. On the other hand, if current level at the endpoint 629 was above the nominal current level 610 then the parameters for using the analog Ramp B circuit will be adjusted to make it less aggressive.

In the particular embodiment illustrated in FIG. 4, the current modulation circuit 490 used analog ramp circuits (491 and 492) as analog computers to create a predicted model of the line current behavior when the FET 461 is switched in order to estimate when to switch FET 461. The analog ramp circuits (491 and 492) are calibrated by a digital system that tested the results after each usage to determine if the parameters for the analog ramp circuits needed to be adjusted thus forming a closed loop system.

However, in various alternate embodiments, a digital system may be used to predict when to switch the FET 461 in order to return the current level back to the nominal current level at the end of the half of a bit cycle. In such a system, analog to digital converters would be used to sample various relevant values and then a digital computer system, such as a digital signal processor (DSP), would determine when to switch the FET. In such an embodiment, the digital computer system may be used to model the future behavior of the electrical current on the driver line if the FET 461 were switched. Similarly, the digital computer system could also estimate the current in the line when the current could not easily be sampled. However, implementing such a digital system would require high-speed analog to digital converters, more die area to implement the digital process, and consume more power than the analog system as disclosed above.

In a very different embodiment of the current modulation circuit 490, current mirrors could be used to drive the proper current on the driver line. However, such an implementation has been found to be less efficient that the disclosed combination of a transistor 461 controlling an inductor 462 to control the current on the driver line.

Referring back to FIG. 4, the LED Line driver IC 420 includes a power system circuit block 480. The power system circuit block 480 receives source power from an external power supply 410 and uses that power to generate the needed power signals to operate the LED Line driver IC 420. In one embodiment, the power system circuit block 480 receives a relatively high voltage source, around 10 volts, that is used to drive the FET 493 in the Current Modulation block 490. Other needed voltage levels are generated from the input voltage source to create voltage sources for other circuits in on the LED Line driver IC 420. A band gap voltage reference circuit is used by the power system circuit block 480 to create the various voltage levels. In one embodiment, the high voltage input is used to generate a regulated 5 volt supply for driving analog circuitry and a 3 volt supply for powering digital circuitry in the LED Line driver IC 420.

In one embodiment, the 3 volt supply and/or the 5 volt supply from the power system circuit block 480 have extra current generation capabilities such that the 3 volt supply and/or the 5 volt supply can be used to power small external devices. For example, the 3 volt supply and/or the 5 volt supply from the power system circuit block 480 may be used to power a small master LED Controller system such as a microcontroller device coupled to the LED Line driver 425.

The LED Line driver IC 420 may implement a ground fault circuit interrupter (GFCI) system for safety and compliance. Specifically, the power system 480 of the LED Line driver IC 420 may receive information from the external power supply 410 as to how much current is being transmitted down the driver line starting at point VSupply 411. Alternatively, the LED line driver IC 420 may detect this current in some manner well known in the art such as using a current sensor. This source current amount may then be compared with the amount of current at the end of the driver line (the output current). For example, the amount of current reaching the end of the driver line may be detected by measuring the voltage at point Vfetsrc 417. (Note that some current may also pass toward the VClamp 412 location such that the current passing that location may also need to be considered.) If the source current differs significantly from the output current then some electrical current may be leaking to ground at a location other than the ground 465 of the power supply 410 at the end of the driver line. If there is a current leaking to locations other than points Vfetsrc 417 and VClamp 412, then some type of potentially dangerous malfunction may be occurring. In response, the LED Line driver IC 420 may turn off the system and stop driving current down the driver line. In some embodiments, the LED Line driver IC 420 may stop for a period of time and then retry operation at a later time to determine if the problem was misdiagnosed or just a transient problem. Whether a transient problem or a significant problem has been detected, the LED Line driver IC 420 may transmit error and diagnostic information up to a controller system using data output 431.

The Individually Controlled LED Unit

As set forth in the preceding sections and illustrated in FIG. 2A, the LED line driver circuit 220 drives a modulated current source on driver line 221 that is coupled to one or more individually controllable LED units (250-1 to 250-N). The only means of electrical contact to a LED unit 250 is through that single driver line 221. Thus, a LED unit 250 must receive all the resources the LED unit 250 needs to operate from that single driver line 221. To accomplish this, the driver line 221 serves multiple functions for the LED units 250. Each of the LED units (250-1 to 250-N) draws its needed operating power from the electrical current on driver line 221. Each LED unit also demodulates LED control data modulated onto that electrical current by LED line driver circuit 220. In one embodiment, each LED unit 250 also uses the nominal electrical current level of the driven on the single driver line 221 as a current reference value. This section describes the internals of the LED units 250 in greater detail.

Figure 7:
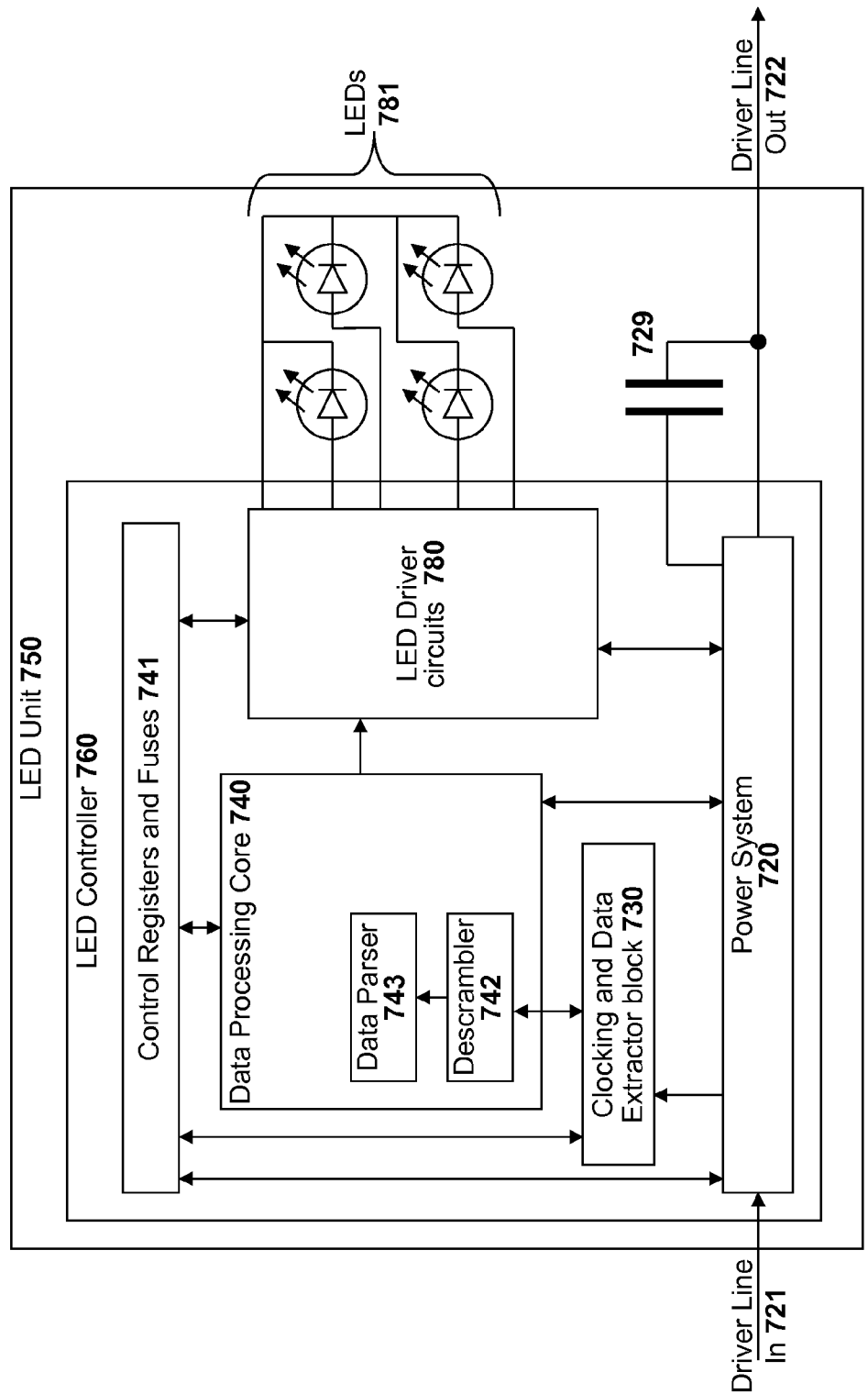
FIG. 7 illustrates one embodiment of an individually controllable LED unit.

FIG. 7 illustrates a block diagram of one embodiment of an individually controllable LED unit 750. In the particular embodiment illustrated in FIG. 7, the LED unit 750 is made up of a LED controller 760, four light emitting diodes (LEDs) 781, and a supply capacitor 729. The supply capacitor 729 captures, stores, and supplies operating power to the LED unit 750. The LED controller 760 may be an integrated circuit that provides most of the functionality of the LED unit 750.

Figure 8:
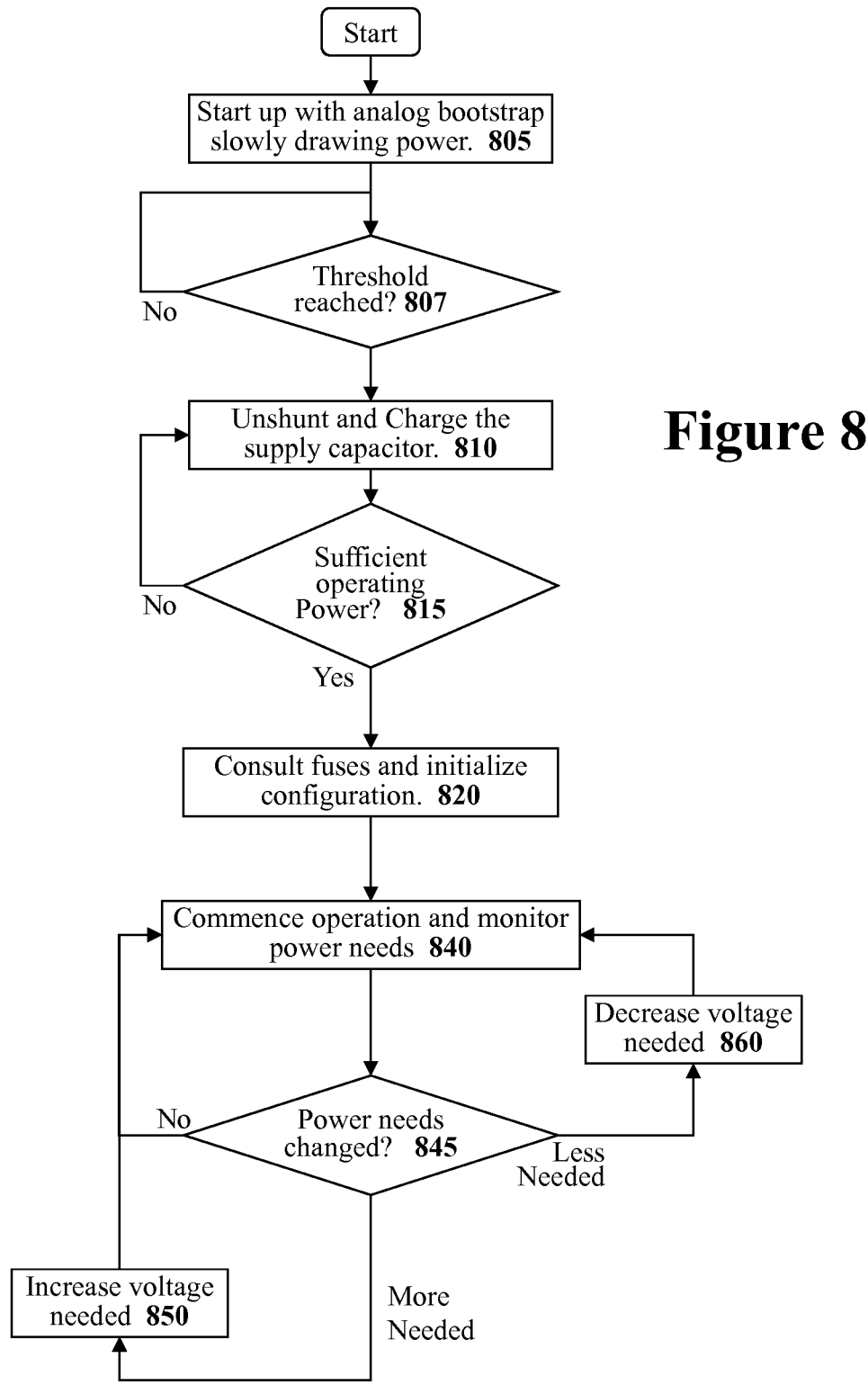
FIG. 8 illustrates a flow diagram describing how the power system of the individually controlled LED units operate.

The LED unit 750 is coupled to an upstream LED line Driver circuit (such as the LED line driver 425 illustrated in FIG. 4) through driver line input 721. Specifically, the driver line input 721 provides a modulated electrical current source to a power system 720 on the LED controller 760. The operation of the power system 720 will be described with reference to FIG. 8.

Initially, when a LED controller 760 starts in a powered-down state, a boot-strap analog power system is initially activated as set forth in stage 805. The boot-strap analog power system draws increasing current while testing if it has exceeded a specified low voltage threshold (approximately 1.5 Volts in one embodiment) at stage 807. When the boot-strap analog power system reaches the specified threshold voltage value, the boot-strap analog power system is turned off and the main power system 720 is activated. The main power system 720 will begin drawing power from the driver line to charge the local supply capacitor 729 at stage 810. This charging of the local supply capacitor 729 will increase the voltage drop across the LED controller 760 from the driver line input 721 to the driver line output 722. (When the charging is complete, the power system 720 will shunt the current directly from the driver line input 721 to the driver line output 722 and operate on local power from the local supply capacitor 729.)

With the boot-strap analog power system, each individual LED unit 750 on a driver line will draw less than the specified threshold voltage (1.5 Volts in one embodiment) upon starting up such that overall voltage drop of all the LED units 750 on a driver line is relatively low. Specifically, the cumulative voltage drop will be at most the threshold voltage times the number of LED units on the driver line. When a first LED unit crosses the threshold value, that LED unit will enter the main capacitor charging state which increases the voltage drop across that specific LED unit. Since the voltage drop for that LED unit is increased, the remaining voltage available to the other LED units will be reduced such that those units will not reach the specified threshold voltage as fast. But one by one, each individual LED unit will eventually pass the specified threshold voltage value and begin charging the local supply capacitor 729 to fully power up. In this manner, the boot-strap analog power system in each LED unit prevents all of the LED units from attempting to enter the capacitor charging state at the same time and thereby exceed the voltage capabilities of the power supply for the driver line. During the normal operating state, each individual LED unit only periodically unshunts for a very short amount of time to keep a needed operating voltage supply.

Referring back to FIG. 8, the power system 720 will charge up the external supply capacitor 729 at stage 810 until the power system 720 determines at stage 815 that the external supply capacitor 729 enough power to activate the circuitry in the LED controller 760 (including the power system 720). The external supply capacitor 729 essentially acts as a small battery for powering both the LED controller 760 and the LEDs 781 on the LED unit 750. The power system 720 will periodically unshunt to draw current from the driver line 721 to recharge the supply capacitor 729 as power requirements dictate.

Once enough power is stored in external capacitor 729, the circuitry in the LED controller 760 will enter a start-up mode at step 820 wherein only a subset of circuits are active. For example, the LED driver circuits 780 are not yet active. During the start-up mode, the control circuitry in the LED controller 760 will perform a set of start-up actions wherein the LED controller 760 configures itself based on the state of non-volatile fuses in the fuse block 741. The charging of the supply capacitor 729 may be turned off during the start-up routine in order to allow other LED units on the same driver line to charge up and enter the start-up mode without creating a high cumulative voltage on the driver line.

After the configuration has been completed, the LED controller 760 will enter a normal operating mode at step 840. The power system 720 will monitor the state of charge in the supply capacitor and switch from line shunting to capacitor charging as necessary to ensure that sufficient charge is available in the external capacitor 729 in order to operate the LED controller 760. Specifically, when power is needed, the shunt will be turned off and charge will accumulate in the external capacitor 729. When the capacitor is deemed full, the power system 720 stops charging and shunts the line current such that the current coming in driver line input 721 passes through power system 720 to driver line output 722 with just a small voltage drop. The current passing out the driver line output 722 will drive subsequent downstream LED units and eventually loop back to the LED line driver circuit to complete the circuit.

In addition to maintaining the needed charge in the capacitor to operate, the power system 720 may also be used to carefully monitor the power needs of the LED controller 760 at stage 845 such that the amount of charge stored in the capacitor may be adjusted accordingly. For example, when a LED controller 760 first turns on some blue LEDs, the power needs of the LED controller 760 may increase such that the system proceeds to stage 850 to indicate the additional needed power to drive the blue LEDs. If the LED controller 760 later turns off the blue LEDs and turns on lower-power consuming red LEDs, then the LED controller 760 may proceed to step 860 to indicate that less power is needed to drive the LEDs. In this manner, the LED controller 760 uses power in a very efficient manner since only the minimum needed voltage to operate the LED unit 750 is maintained on the external capacitor 729.

If there are a large number of LED units 750 on a single line, then the cumulative voltage of multiple LED units 750 in series wherein each LED unit 750 is attempting to charge a local capacitor can become high. To prevent this situation, the current can be increased and the multiple LED units 750 can be instructed to draw power in a coordinated manner. For example, only a limited number of LED units 750 may be permitted to unshunt to charge the local supply capacitors at the same time. By using an increased amount of current on the line, each LED unit 750 on the line will be able to charge its supply capacitor at a faster rate. By increasing the line current and limiting the number of units that may simultaneously draw current, the overall voltage of the line can be kept within a prescribed range.

One method of coordinating the shunting of different LED units 750 is on a bit by bit basis. Each bit in the data frame can assumed to be numbered starting from zero to F−1 wherein F is the number of bits in a data frame. Then, each LED unit 750 can be instructed to only unshunt every N bits where N is a number selected by the LED line driver. For example, if the number four is selected as N then first group of LED units 750 will only unshunt on bits 0, 4, 8, etc. A second group of LED units 750 will only unshunt on bits 1, 5, 9, etc. A third group of LED units 750 will only unshunt on bits 2, 6, 10, etc. And a fourth group of LED units 750 will only unshunt on bits 3, 7, 11, etc. By coordinating unshunting on a bit by bit basis (as opposed to a longer time period) every LED unit 750 will not have to wait long before being given another time when the LED unit can draw more charge.

The power system 720 includes an analog circuit section that generates a bandgap reference voltage and has the capability to set the regulated voltage to just the right amount to allow all the local LEDs to turn on as set forth above. The power system 720 monitors for bad LED outputs (short circuits or open circuits) and attempts to regulate the voltage to the minimum voltage level needed to work with the LEDs that are powered on. All changes to the shunt/unshunt operation of the line current is performed in coordination with the data on the line, so that all LED chips are transitioning at the same time. This coordination is done to minimize potential data errors.

The analog section of the power system 720 contains a bandgap reference that is used as a voltage reference for three of the power system's four main power related functions. First, the bandgap reference is used to generate a voltage source (approximately 2.8 to 3.2 volts) for the core digital circuitry. Second, the bandgap reference is a reference to a digitally controlled voltage divider circuit that samples the LED driver supply and compares it to the bandgap reference. Finally, bandgap reference voltage may be used in an over-voltage/over-current detector. The over-voltage detector uses carefully matched poly resistors to detect excessive voltage on the LED driver supply and measure line current. The over-voltage detector is enabled any time the capacitor 729 is charging. If there is an insufficiently sized capacitor such that an over-voltage condition is detected, then the chip will transition immediately to protect the chip.

The fourth function of the power system 720 is line shunting operation performed by a line shunt and line current rectifier section that is digitally set to shunt line current to the driver line out 722 or charge the supply capacitor 729. In normal operation, the power system 720 will periodically unshunt the line current such that current is directed to recharge the supply capacitor 729. This unshunting may be performed in a manner coordinated with other LED units coupled to the same driver line such that not too many LED units are simultaneously attempting to draw power current from the driver line.

The power system 720 unshunting of the driver line 721 to charge the supply capacitor 729 is a very critical function for the LED controller 760 since the charging of the supply capacitor is required to obtain the electrical power required to operate the LED controller 760. Similarly, the shunting of the driver line 721 after supply capacitor charging is also very critical since if the power system 720 fails to quickly shunt the current to the output driver line 722 when the supply capacitor 729 is fully charged, then the LED controller 760 may malfunction due to excessive voltage that breaks down the integrated circuitry of the LED controller 760. Thus, the shunting and unshunting of the input driver line 721 is a task that requires careful control by power system 720.

Fortunately, this situation requiring a careful balance provides a very graceful manner in which a malfunctioning LED controller on a driver line in series with other LED controllers may malfunction without significantly affecting the other LED controllers on the same driver line. Specifically, if the circuitry in a malfunctioning LED controller 760 malfunctions in some manner wherein the power system 720 no longer charges the external supply capacitor 729 but instead remains in a permanent shunted state, then that power system 720 acts as a short circuit that the line current passes through (generally with a slight voltage drop across the shunt). Thus, the other individual LED controllers on the same driver line will continue to receive current from the line driver.

On the other hand, if the circuitry in a malfunctioning LED controller 760 malfunctions in a different manner wherein the power system 720 becomes stuck in an unshunted state thus continually charging the external supply capacitor (and fails to enter a shunting state that directs the current around the external supply capacitor), then that power system 720 acts as an open circuit that would affect all of the other LED controllers on the same driver line. However, all of that current entering the LED controller 760 will increase the voltage across the power system 720 of that LED controller 760 until the voltage across power system 720 eventually causes a breakdown of the integrated circuit (similar to a Zener diode or perhaps just a short circuit). Once such a breakdown occurs, the driver line current will then again pass from the driver line input 721, through the malfunctioned LED controller 760 and out the driver line output 722. The current passing through the malfunctioned LED controller 760 will then allow the other LED controllers on the same driver line (721 and 722) to continue operating normally. For additional protection, a breakdown device (such as a Zener diode or similar device) that requires a higher voltage than normally exhibited by the LED controller 760 may be placed in parallel with a LED controller 760. In this manner, if the LED controller 760 malfunctions in an open circuit manner, the voltage will increase until the higher voltage needed to activate the breakdown device is reached thereby causing an electrical path around the malfunctioned LED controller 760.

To prevent damage to the LED controller 760, a temperature system may monitor the temperature of the LED controller 760 integrated circuit. If the temperature exceeds a danger threshold, the power system 720 may enter a shutdown state to prevent any damage to the LED controller 760. In one embodiment, the power system 720 may enter a state wherein the power system 720 enters a permanently shunted state such that current coming in the driver line input 721 passes directly through to the driver line output 722. In this manner, the other LED units on the same driver line can continue to operate normally. If a particular LED controller 760 repeatedly enters such a shutdown state, that LED controller 760 may need to be replaced. In other embodiments, the LED controller 760 may enter a reduced functionality state wherein just a subset of the electronics continues to operate and it only rarely unshunts to obtain additional power. In this manner, the LED controller 760 could periodically retest the temperature and reactivate itself if the temperature is reduced.

Two non power related functions that may be provided by the power system 720 are the creation of a current reference value and the creation of a current copy for data extraction. To drive a LED with the most consistent light output properties, a constant current amount should be passed through the LED. When the brightness of a LED is controlled by varying the amount of current passed through the LED then the spectrum of colors emitted by the LED may vary with the amount of current passed through the LED. Since a consistent spectrum of colors is the ideal goal, the technique of modulating the current amount does not provide the desired performance. Furthermore, the brightness of a LED has a non-linear relationship to the current strength such that it is difficult to accurately control the LED brightness using current variance.

Instead of using the current strength to control the brightness of an individual LED, the brightness of a LED is typically controlled by controlling a timed on/off duty cycle of a constant current amount. One well-known system of implementing this technique for controlling power is generally known as "pulse width modulation" since the brightness of the LED is proportional to the width of constant current strength pulses during a defined time period. In one embodiment, the system of the present disclosure uses a different technique wherein both the number of constant current pulses and the width of those constant current pulses during a defined time period are modulated to obtain the desired brightness. This alternative system is named "Reduced Flicker Modulation" (RFM) and will be fully described in a later section covering the LED driver circuits 780.

For optimal LED output performance, the amount of current used to drive the LEDs 781 during each constant current pulse should as consistent as possible. Thus, a consistent current reference value is needed. Various different methods may be used to create a current reference value. Two different systems of having the power system 720 create a current reference value are hereby provided.

A first method of having the power system 720 construct a consistent current reference value is to use a voltage reference value. Specifically, a consistent current reference value may be created by generating a consistent voltage reference value with a bandgap circuit and then passing that consistent voltage reference through a resistor to create a desired consistent current reference value. This current reference value may then be provided to the LED driver circuits 780 that will use the current reference to create a constant current that will be used to drive the LEDs 781 in a consistent manner.

In an alternate embodiment, the power system 720 may create a current reference by sampling current on the driver line. Specifically, the power system 720 may sample the driver line current to determine an average driver line current value (the nominal line current as illustrated in FIG. 3) from the driver line 721. This average line current value may then be used as a current reference value to the LED driver circuits 780. The driver line current average is only updated/determined while the power system 720 is shunting the driver line.

The other non-power related function performed by the power system 720 is the creation of a line current copy for data extraction. To enable the recovery of data modulated onto the line current of driver line 721, the power system 720 provides a downscaled copy of either the shunting current sense or the unshunting (or diode) current sense to the data extractor block 730. The shunting current sense is provided when the power system 720 is in shunting mode and the unshunting (or diode) current sense is provided when the power system 720 is charging the external supply capacitor 729.

The clocking and data extractor block 730 receives a copy of the driver line current from the power system 720 and is responsible for demodulating the data (such as LED controller configuration commands and actual LED control data) that has been modulated onto the driver line current by the LED line driver circuit 425 of FIG. 4. In order to demodulate the data from the driver line current, the data extractor block 730 must first generate its own internal clock signal, then use a digital phase-locked loop (DPLL) to synchronize itself with the data rate of the data modulated onto the driver line current, and finally properly align itself with the current ramps modulated onto the driver line current to extract the data.

To generate an internal clock signal, a digital subsection of the clocking and data extractor block 730 implements a fast ring oscillator and has an associated section of digital logic that runs at the fast ring oscillator rate. This fast oscillator rate digital logic subsection provides several functions that can only be provided with the faster clock rate. First, the fast clock section provides the digital support to ensure the centering logic that locates the center of current ramps is properly centered on the line current data stream. The second function is a divide by N counter of the fast free running ring oscillator clock. The divide by N counter only updates on core clock boundaries to help prevent glitches. The divide by N counter value from the fast clock section is used to help implement the DPLL circuit that locks onto the data modulated on the driver line 721. The data rate of the data stream on the driver line obtained using the digital phase-locked loop circuit is then used to create a core clock signal that is used to drive most of the LED controller 760. In one embodiment, the core clock rate operates at eight times (8×) the data rate of the driver line.

In one embodiment, the clocking logic initially sets a fixed value into the divide by N counter, and counts the shunt A/D converter crossings to generate an initial estimate of the data clock frequency value. The clocking logic then loads this initial estimated frequency value into the digital phase-locked loop circuit and the digital phase-locked loop circuit tries to lock onto the driver line data rate. If the clocking logic does not obtain a lock confirmation from the digital phase-locked loop circuit within a particular time period, it enters a resynchronization mode where the clocking logic restarts the clock frequency measurement process.

The main portion of the clocking and data extractor block 730 operates at the core clock rate that is generated using the digital phase-locked loop circuit. Much of main portion of the clocking and data extractor block 730 comprises the circuitry used to implement that digital phase-locked loop circuit (with help from the fast clock section).

Figure 9:
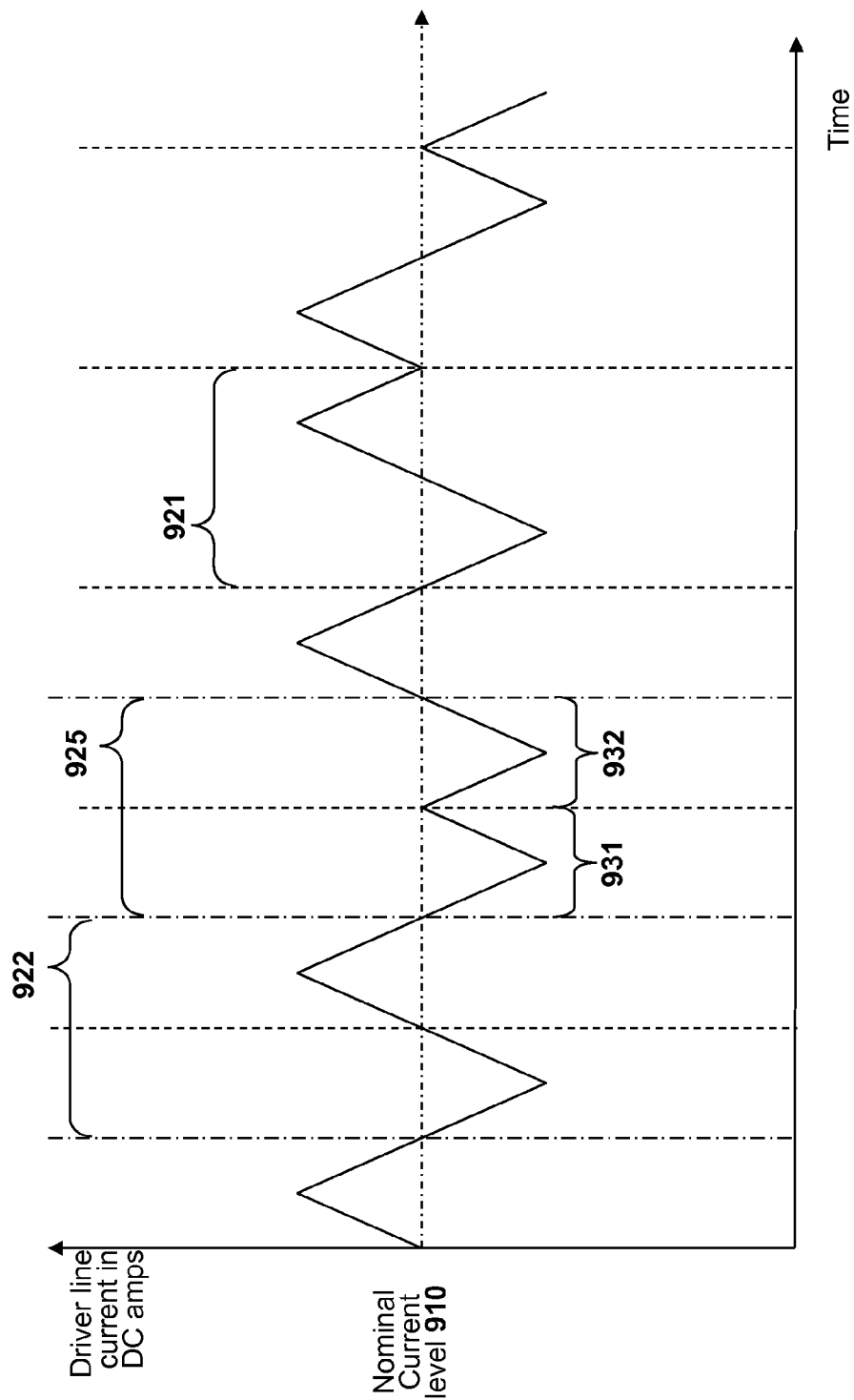
FIG. 9 illustrates how a data cycle misalignment may occur.

In addition to the digital phase-locked loop, the main portion of the clocking and data extractor block 730 includes the data extractor logic for extracting the actual data from the driver line signal. The data extractor logic is responsible for discriminating between the data center and data edge transitions because the digital phase-locked loop might lock to the data bit edge transition instead of the data bit center. Specifically, referring to FIG. 9, the signal in a proper data bit time 921 may appear almost identical to the signal in an incorrect data bit time 922 where the DPLL has locked onto the data bit edge transition instead of the data bit center. To prevent this problem, the data extractor logic looks for the signal before data bit center to be different than after the center since a proper data bit will always appear this way. Specifically, incorrect data bit time 925 illustrates how the signal appears the same both before 931 and after 932 the incorrect data center (an actual data bit edge). This informs the data extractor logic that the digital phase-locked loop has locked onto a data bit edge transition instead of a data bit center. If there are too often the same value before and after, the data extractor logic moves the alignment a ½ bit cycle to properly align with the data bit center.

Referring back to FIG. 7, after obtaining a proper lock onto the data rate and properly aligning with the data bit centers, the clocking and data extractor block 730 passes the demodulated data stream to the data processing core 740. The data processing core 740 is a block of digital logic that processes the incoming LED control data. In one embodiment, the data processing core 740 is responsible for identifying individual data frames; parsing the data frames to obtain LED controller configuration commands, LED control commands, and LED parameter data; and then executing the commands extracted from the LED control data.

In one embodiment, the first action performed by the data processing core 740 on incoming LED control data is descrambling of the data stream. The data stream encoded onto the driver line 721 may be scrambled for various different reasons.

One reason for scrambling is to prevent the LED unit 750 from locking to the wrong data framing signal. If a LED control data value repeatedly sent to a particular LED unit 750 happened to be the same as the framing synchronization header value, then the LED controllers might lock to the wrong place of the data stream and never see valid data frames. Scrambling of data prevents this situation since even if the data payload is fixed value, the data scrambling causes it to be different on the driver line each data frame. Thus, the data scrambling greatly reduces the probability of creating false framing patterns in the data stream. Another reason to scramble the data is to reduce electromagnetic interference issues since the scrambling of the data spreads out the energy. To handle the scrambled data stream, a descrambler unit 742 in the data processing core 740 initially processes the incoming data by looking for frame synchronization markers and then descrambles the scrambled data frame to obtain the actual data commands in the data frame.

In one particular embodiment, a LED control data frame consists of 40 bytes as illustrated in FIG. 2B. The following table illustrates the structure of the example data frame illustrated in FIG. 2B:

TABLE 1

Example Data Frame

| Name | Byte Position | Function/Value |
|---|---|---|
| StartFrame | [0] | This is the 'start frame' synchronization indicator for the state machines to lock onto. This value is not scrambled. |
| Cmd | [1] | The command which is being send to the LED controller. |
| Addr | [2] | The LED controller address associated with the frame. This address is used to select which LED units on a driver line will respond to the command in this data frame |
| Payload | [38:3] | 36 byte payload. For LED control commands, this data payload is the parameter data associated with individual pixels may be 4, 6, 8, or 12 bits wide. For LED controller configuration commands, the payload data may identify fuses or control registers to be changed. |
| CRC | [39] | A CRC check, which can be enabled to improve immunity to any erroneous commands. |

Referring to the preceding table, the first byte is a frame header used to indicate the start of a data frame. The frame header byte is not scrambled and the remaining thirty-nine (39) bytes may be scrambled using a v.34 self-synchronizing scrambler. The data frame detection logic of the descrambler unit 742 searches the incoming data for a repeating frame header in the data stream. The descrambler unit 742 attempts to lock onto that pattern. If no data frame is found after a certain amount of time then the descrambler unit 742 will inform the clocking and data extractor block 730 of the problem. The clocking and data extractor block 730 may then switch to a new frequency and assert a resynchronize signal. This action will reset any possible frame locks that might have been started and start the frame detection logic of the descrambler unit 742 searching for a data frame once again.

When the frame detection logic of the descrambler unit 742 detects a data frame pattern, the descrambler unit 742 will assert a valid frame signal back to the clocking and data extractor block 730 to indicate valid data. In one embodiment, the descrambler unit 742 is active at least one frame before the data parser block 743 gets valid data to make sure that the descrambler unit 742 has locked onto the incoming data stream and has the proper output data. This ensures that the descrambler unit 742 has synchronized with the incoming data stream. Once the descrambler unit 742 has obtained a proper lock on the incoming data and completed descrambling processing, the descrambler unit 742 passes the descrambled data frames to the Data Parser 743 for processing of the contents of the data frame.

The Data Parser 743 parses the data frames. The Data Parser 743 identifies the command in the data frame (a LED controller configuration command or a LED control command) and decodes the payload of data frame (LED controller configuration parameter or LED control data parameters). In one embodiment, the Data Parser 743 will perform the optional cyclic redundancy code (CRC) check and if the data is good the Data Parser 743 passes the decoded command and parameter data to execution logic in the data processing core 740.

In one embodiment, the Data Parser 743 has multiple different pixel addressing modes that are used to determine if a particular data frame that was received should be applied to this specific LED controller 760. A standard addressing mode places a specific LED unit address in the address field of a data frame. In one embodiment that address specifies a start address for the LED control data in the data field. The specific LED unit identified in the address field will use the first item of LED control data in the payload field up to the LED control data width. The next sequentially addressed LED unit will use the next item of LED control data in the data payload field up to the LED control data width and so on. In other embodiments, the address may specify a single LED unit or a specified number of consecutive LED units. Note that in the present system, the size of the data payload is 288 bits such that it may store even multiples of 2, 4, 6, 8, or 12 bit wide data values.

In a group address mode, the LED control data in the data payload will only be applied to LED units assigned to a particular group. The control data may simply be applied to all the LED units in the group. In one embodiment, the system uses a bitmap processing engine that may examine a bit map in the payload to determine which subset of LED unit members of a group should change and how those LED unit members should change. Thus, each LED is addressable individually in the standard linear addressing system and each LED is addressable individually as part of an assigned group.

Data errors detected by the cyclic redundancy code (CRC) check may be handled in various different manners. In one embodiment, if the optional CRC protection has been enabled, the data processing core 740 will start to ignore data if two CRC errors are detected during a window of about 25 data frames. Furthermore, the LED outputs may be turned off during this period and the data processing core 740 will not respond to new commands. In one embodiment, the data processing core 740 will continue examining incoming LED control data frames until four data frames with correct CRC values are received. At that point, the data processing core 740 will begin processing new commands.

Many different types of commands may be implemented on a LED Controller 760. In one particular embodiment, three main types of commands are implemented: a pixel data update without a global update, a pixel data update with a global update, and a write to a control register within the LED Controller 760. A pixel update without a global update stores a set of parameters for driving one or more LEDs into a shadow register. However, those LED parameters are not immediately used. Then, when a global update command is received (addressed to this LED controller 760 or any other LED controller) the stored pixel data parameters are then used change the output of the LED driver circuits 780. In this manner, changes to many pixels can be synchronized as is needed for video displays and other display systems that operate with a series of distinct display frames.

When the data processing core 740 receives a write to a control register, the data processing core 740 will identify the appropriate control register in the control registers & fuses block 741 and write the associated data value into that control register. The contents of the control registers are volatile control bits that control the operation of the circuitry in the LED controller 760. Certain patterns of writes to control registers can be used to activate various functions instead of just setting the value of a specified control register.

In addition to the volatile control registers, the control registers & fuses block 741 also contains a set of non-volatile fuses. The fuses may be burned in order to specify a set of permanent configuration information in a LED controller 760. For example, one embodiment of a LED unit 750 implements an eight bit address value using eight fuses. In this manner a string of 256 uniquely addressable LED Units may be coupled to a single LED line driver circuit. To program the fuses in the control registers & fuses block 741, a specific pattern of writes to specified control register addresses is sent. (Note that there may or may not actually be real control registers at those specific control register addresses.) When the proper pattern of writes to specified control register addresses is sent, the data processing core 740 will burn a particular identified fuse in the control registers & fuses block 741.

The fuses in the control registers & fuses block 741 may both be used by a manufacturer that creates LED controllers 760 and a user of LED controllers 760. The manufacturer may use the fuses in the control registers & fuses block 741 to create a wide variety of different LED controllers with different performance characteristics and capabilities from the same integrated circuit design. For example, fuses in the control registers & fuses block 741 may be used to specify the number of LEDs controlled by the LED controllers 760, the accuracy of the LED control (4 bit, 6 bit, 8 bit, or 12 bit, in one embodiment), and various other LED controller features that may be enabled or disabled. In this manner, the manufacturer of LED controllers 760 may segment the marketplace of LED controllers 760 depending on how many features are required for a particular application.

Fuses in the control registers & fuses block 741 may also be used to store calibration information in LED controllers 760. Imperfections and inconsistencies in semiconductor process technology mean that no two integrated circuits will behave exactly the same. With purely digital integrated circuits, small differences will not affect the operation due to the discrete quantized data values used in digital circuits. (Large imperfections in the manufacturing of digital integrated circuit devices will create inoperable devices that are discarded.) With the LED controller 760, the presence of numerous analog circuits will mean that manufacturing differences may noticeably affect the behavior of different LED controllers.

To deal with these behavioral differences, each individual LED controller 760 will be tested and various differences between different LED controllers can be compensated for by using the fuses to store calibration data that adjusts for slight differences between different LED controllers. For example, the brightness of a LED is controlled by the amount of current that passes through the LED. But due to imperfections in integrated circuit manufacturing, the amount of current provided by the LED driver circuits 780 of different LED controllers when commanded to provide the exact same brightness level may not be identical. Thus, fuses in the control registers & fuses block 741 may be used to store current tweak/trim values designed to calibrate the current delivered to LEDs by the LED driver circuits 780. Each different LED channel on a LED controller 760 may receive its own individual current tweak/trim value.

Note that LEDs themselves may also suffer from imperfect manufacturing technology. Different LEDs that receive the exact same amount of current will not output the exact same brightness. Thus, by coupling LEDs 781 to a LED controller 760 before testing, slight manufacturing differences in both the LED controller 760 and the LEDs 781 can be compensated for with current tweak/trim calibration data programmed into the LED controller 760. This ability to calibrate current output provided by the LED driver circuits 780 allows the LED controller 760 to use less expensive LEDs that have not passed strict brightness calibration tests since the current calibration values will compensate for the varying LED in addition to the varying LED driver circuits 780.

The users of a LED controller 760 may program a set of user accessible fuses for various different application specific features made available to the users. For example, a LED controller 760 may be designed to operate with either common anode LEDs or common cathode LEDs. The usage of a CRC value to test data frames for errors may be specified by a fuse. And, as set forth earlier, a set of device address fuses may also be user programmable.

On rare occasions, a fuse that has been burned out may later appear as not burned out if various elements within an integrated circuit migrate due to heat or other causes. If this occurs, the fuse programming done to a LED controller 760 may become corrupted thus causing the device to operate improperly. To prevent this from occurring, one embodiment allows for extra fuses that may be burned in order to implement an error correcting coding (ECC) scheme. Thus, if a fuse becomes unburned, the ECC can be used to determine which fuse changed and adjust the operation of the LED controller 760 accordingly.

As set forth earlier, some embodiments of the disclosed system may allow the LED line driver to request status from a LED unit such that the LED unit will respond to the status request with the requested information. Similarly, some embodiments may have the LED units provide an acknowledgement after receiving a command. To respond to a status request (or provide an acknowledgement), the data processing core 740 may request the power system 720 to operate its shunt circuitry in a manner that is detectable by the LED line driver during a specified time window. In order to determine which LED unit 750 is responding, the LED line driver may only make one request at a time or provide a different time window for each LED unit 750 to respond within. Another method of signalling with the shunt circuitry is to have a power system perform a high frequency burst of unshunt and shunt operations such that the LED line driver could detect a frequency.

Referring back to FIG. 7, the final circuit block of the LED controller 760 is a circuit block containing LED driver circuits 780 for driving the LEDs 781. There is an independent LED driver circuit for each LED output on the LED controller 760. In the embodiment of FIG. 7, there are four different LED driver circuits for driving the four different LEDs 781. However, other embodiments contain LED driver circuits for handling a different number of LEDs 781. In the particular embodiment depicted in FIG. 7 the LEDs 781 are wired in a common cathode configuration. In a common anode configuration, the LED symbols would face in the other direction.

Each independent LED driver circuit has both digital and analog circuitry portions. The digital circuitry portion interfaces with the data processing core 740 and control registers & fuses 741. The digital circuitry portion receives the digital information specifying an intensity value indicating how much power a LED should receive. This intensity value is then adjusted according to various factors and used to drive the constant current output. The analog LED driver circuitry receives a current reference from the power system 729 and creates the constant current that will be used to actually drive the associated device.

The digital portion of a LED driver circuit controls exactly when an associated LED is to be powered on and off. To determine how to properly drive the LEDs, the digital portion consults the control registers & fuses 741 for configuration information. The control registers & fuses 741 may specify several different parameters such as if the LED is allowed to operate, if the LEDs are sinking or sourcing current (using common anode mode or the common cathode mode illustrated in FIG. 7), what the current trim/tweak value is for the LED, and a LED turn on delay factor. This LED configuration information is combined with the LED control information received in a LED control data frame that specifies a LED intensity value (which may be zero if the LED is to be turned off) to determine how the LED will be driven. Various different output modulation systems may be used to drive the LEDs.

In addition to the fixed current trim/tweak values as designated by the fuses, the LED driver circuits 780 may also dynamically adjust the current for LEDs. For example, the output of a temperature sensor circuit may be provided to the LED driver circuits 780. The LED driver circuits 780 may then adjust the current provided to the LEDs in response to the ambient temperature. In this manner, the LED driver circuits 780 can adjust for temperature differences that may affect the performance of LEDs and the LED driver circuit itself. Note that by having each individual LED unit have an internal temperature sensor, the disclosed system allows for properly correction on a pixel by pixel basis. Thus, if the sun is shining on some LED units but not others (due to a shadow), each individual LED unit will make the appropriate corrections based upon its local conditions.

In a traditional pulse width modulation (PWM) embodiment, the output power is determined by the width of a pulse output during a defined time period. For example, FIG. 10A defines a time period of 16 time units and how a four bit intensity value may be represented as pulse width modulated power on that time period. If the intensity is zero ("0000"), there is no pulse. If the intensity value is one ("0001") then a pulse with a width of one time slot is output. If the intensity value is two ("0010") then a pulse with a width of two time slots is output. And so on up to an intensity of fifteen ("1111") wherein a pulse that is fifteen time slots wide is output. The traditional pulse width modulation described with reference to FIG. 10A may be used within the LED driver circuit 780 in LED controller unit of the present disclosure. However, a novel output method referred to as "reduced flicker modulation" (RFM) may also be used which provides several advantages.

The reduced flicker modulation system provides at least three advantages over the traditional pulse width modulation system. Specifically, the reduced flicker modulation system: (1) Increases the switching (switch-on and switch-off) frequency to higher frequency ranges and thus reduces perceptible flicker; (2) Spreads out the electrical current usage across time thus reducing peak power requirements, and (3) introduces a randomization that prevents various data dependent patterns from affecting the output in a noticeable manner. Spreading out the current usage is important in systems with limited power availability. For example, if there is only 140 milliamps of current available on average (buffered by a capacitor) and there are two LEDs operating at a constant current of 100 milliamps with each set at a 60% duty cycle then on the average there is enough current. However, if a PWM system were used to drive the LEDs then the PWM would have both LEDs on concurrently for at least 10% of the time, during which the two LEDs would draw 200 milliamps combined, thus drawing more current than is available on average. With the RFM system, the current usage is spread out more evenly across time such that the two LEDs would not draw more current than is available on average and thus avoid overloading the current supply from the line.

To increase the switching frequency and spread the current usage out more evenly, the reduced flicker modulation system provides a constant current output for substantially the same number of time units during a given time period as a PWM system but the time units when the constant current is turned on are more evenly distributed across the time period. FIG. 10B illustrates how the reduced flicker modulation would output the constant current pulses for the same energy output of the PWM example of FIG. 10A.

To generate the output patterns of FIG. 10B, the four patterns of FIG. 10C associated with each bit position can be logically ORed if the respective bit position of the intensity value is on. For example, if the intensity level 9 ("1001") were specified, then the pattern associated with the most significant bit position ("1000") and the pattern associated with the least significant bit position and the ("0001") could be logically ORed together as illustrated in FIG. 10C.

Figure 10A:
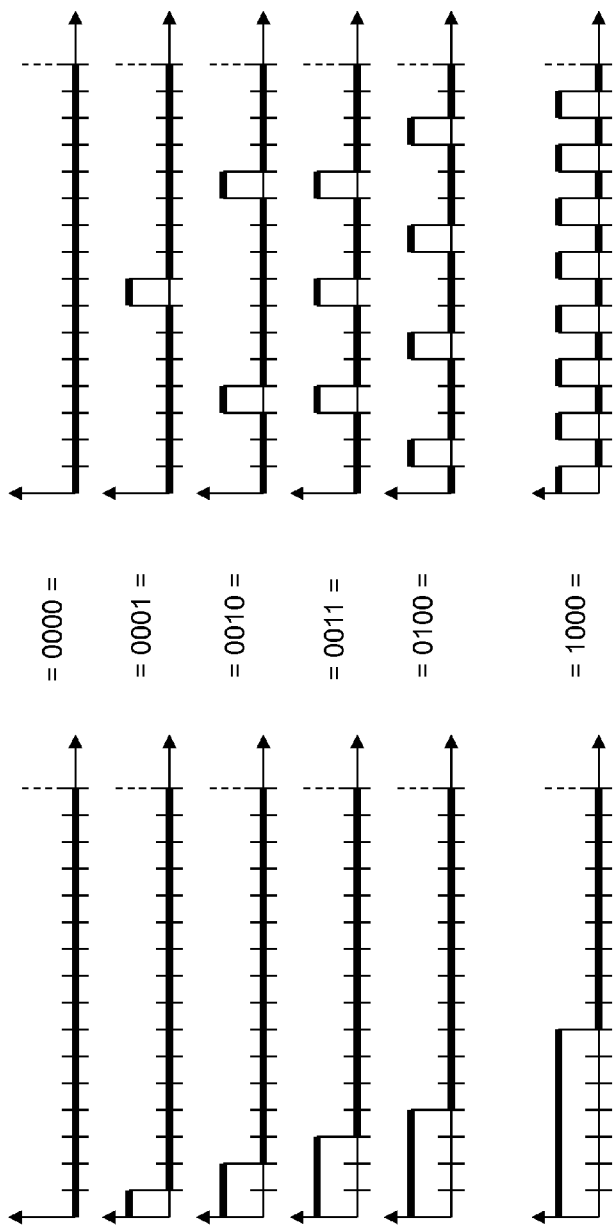
FIG. 10A illustrates pulses created with traditional pulse width modulation.
Figure 10B:
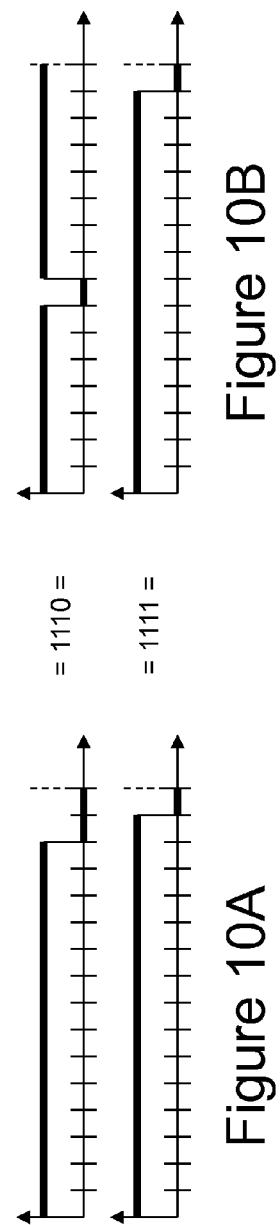
FIG. 10B illustrates pulses created with a reduced flicker modulation system.

When comparing the output of the pulse width modulation system of FIG. 10A to the output of the reduced flicker modulation system of FIG. 10B, it can be seen that more individual pulses will occur per time period when outputting power with the reduced flicker modulation system. Specifically, with the pulse width modulation system of FIG. 10A there is only one constant current pulse for each time period whereas the reduced flicker modulation system that spreads the energy more evenly across the time period has multiple constant current pulses. Each constant current pulse created with either system will not be a perfectly formed ideal square pulse. FIG. 10D illustrates a close up of an ideal current pulse drawn with dashed lines and a more realistic current pulse drawn with a bolded solid line. As illustrated in FIG. 10D, the rise time and fall time of the constant current pulse will not be zero as illustrated in the ideal square pulse. With a real constant current pulse, the rise time will generally be longer than the fall time. (This lengthening of the rise time is referred to as the "LED turn on delay" in this document.) Thus, the amount of energy output during a real constant current pulse will be less than the amount of energy that would be output during an ideal square constant current pulse. This reduced energy output will therefore cause the LED output to be less intense then desired. If this effect is not compensated for, there will be non linearity in the intensity output scale.

To compensate for this effect, the digital circuitry of the LED driver circuit 780 may count the number of constant current pulses that occur and add an extra constant current pulse time unit after a designated multiple of constant current pulses. For example, if the real constant current pulse of a single time unit outputs 5% less energy than the ideal square constant current pulse of a single time unit then for every twenty pulses that occur, an extra time unit of constant current will be added since twenty times five percent equals one hundred percent, or a full time unit pulse was lost. In one embodiment, an adjustable LED turn on delay value is to store a representation of the amount of energy lost on each pulse. The LED turn on delay value is added to an accumulator for the associated LED after each constant current pulse. When the accumulator overflows, an extra time unit is added to the LED "on" time to make up for this missing energy.

As set forth in the description of the clocking and data extractor block 730, the LED controller 760 may use a free running internal ring oscillator to create the core clock signals used to drive the digital circuitry. The fast free running ring oscillator clock may exhibit some clock jitter. To create a core clock, the fast free running ring oscillator clock is reduced with a divide by N counter controlled by a digital phase-locked loop. The use of a digital phase-locked loop to create the core data clock will introduce some quantization error into the core clock. As a result of this, the internal core clock can have slightly different time lengths for the individual core clock cycles. Since the core clock is used to drive the LED outputs, the LED on time units will also have these slightly different time lengths.

When this small clocking inaccuracy of LED on times is combined with a LED control data pattern in phase with the clocking inaccuracy, the effect will be exaggerated such that the LED output may be noticeably affected. To prevent any such small clocking imperfection from combining with LED on/off data pattern in manner that adversely affects the LED output performance, a randomization of the turning on and off of the LED outputs is introduced into the LED on/off data pattern. Specifically, the times at which the LED will be turned on may be randomly moved around within a time period. However, the LED will still be turned on for the same amount of time during the time period such that the net LED power output is unchanged. For example, FIG. 10E illustrates three different possible randomizations of the output pattern of FIG. 10C. In one embodiment, this randomization is added to the LED on/off control pattern using a Linear Feedback Shift Register (LFSR) that creates a pseudo-random series of bits. This randomization introduced into the LED on/off output pattern thereby effectively eliminates the possibility of a data dependent pattern interacting with the imperfect clocking in manner that would adversely affect the LED intensity.

In addition to the two constant current methods of controlling LED intensity set forth above (pulse width modulation and reduced flicker modulation), other means may be used to drive the LEDs 781. For example, varying the current strength provided to the LEDs may be used to control the brightness of the LEDs 781. However, this method should be avoided since it will not provide good consistent color output.

The digital circuitry portion uses the analog portion of a LED driver circuit 780 to drive the associated LED. The analog LED driver circuit uses a current reference received from the power system 720 to drive the LED with constant current pulses. The analog LED driver circuit signals to the power system 720 when the analog LED driver circuit does not have enough voltage from the power system 720 to operate properly. The analog LED driver circuit also signals to the power system 720 when a LED appears to have malfunctioned. Specifically, if the current passing through the LED is too high or zero, then the LED driver circuit may determine that the LED appears to be a shorted circuit or an open circuit, respectively. When a LED has malfunctioned, the system will stop activating that LED. The system may periodically retest the LED to determine if the malfunction was inaccurately detected or the problem was transitory. If the system determines that one LED has malfunctioned, the LED controller many deactivate other LEDs related to the malfunctioned LED. For example, if one LED in a set of red, green, and blue LEDs used to create a colored pixel has malfunctioned then all three LEDs associated with that pixel may be deactivated.

In one embodiment, the LED driver circuit may monitor the current provided to a LED and make calibration adjustments based upon the current passing through the LED. For example, if there are multiple LEDs of the same type but more current is passing through some of the LEDs than others, then the LED driver circuit may adjust the rate of constant current pulses provided to the LEDs accordingly. For example, those LEDs that are receiving less current may be provided with high rate of current pulses in order to equalize the power output of the different LEDs.

The technique of adjusting the rate current pulses in response to detected current differences may be used whether the difference in current is unintentional or intentional. Current differences may be allowed to occur intentionally in order to improve the energy efficiency. Specifically, instead of carefully regulating the voltage provided to different LEDs by burning off excess voltage as heat in order to obtain the same amount current through each LED, a system may provide the same voltage to different LEDs even though this may result in different amounts of currents passing through each LED due to manufacturing differences between the different LEDs. To equalize for the current differences, corresponding different rates of current pulses may be provided to each LED. LEDs with lower current will receive a higher rate of current pulses. Thus, instead of equalizing the current in a manner that inefficiently burns off excess energy, the different LEDs will be equalized by adjusting the rate of current pulses provided to each LED.

The LED line driver circuit 425 of FIG. 4 coupled to a set of the LED units 750 of FIG. 7 forms a very efficient LED lighting system that minimizes the amount of power wasted. In the LED line driver circuit 425, the main line driver FET 461 is always fully on or fully off such that it dissipates very little power as heat. In the individual LED units 750, the local power system 720 shunts the line current when the local supply capacitor of the LED unit is charged thus passing all the current to the next LED unit on the line. Within each individual LED unit 750, the control circuitry uses minimal power such that the LED driver circuits 780 dissipate most of the power into the enabled LEDs 781. So the overall controlled LED lighting system is very efficient. The system draws only fairly limited power when LEDs are off. And when the LEDs are on, the system wastes very little power.

As illustrated in embodiment of FIG. 7, each LED unit controls four different LEDs however other embodiments can have a different number of LEDs. To further optimize power usage (and reduce cost) groups of three LED units controlling N LEDs each can be used to implement N pixels (each having red, green, and blue LEDs) by having each of the three LED units support a single color. For example, with the embodiment of FIG. 7, four independent pixels could be created by having each LED unit control four LEDs of the same color. Such a deployment of LED units would further optimize power usage since the different colored LEDs require different amounts of power and each LED unit would only draw the needed power to support its specific colored LEDs (red, green, or blue).

Advanced Color System

In an alternate embodiment, the individual LED units may be implemented as pixel circuits wherein the LED units are provided with color data to drive colored pixels made up of red, green, and blue LEDs. Each LED unit may control one or more pixels. The pixel circuits would receive color/brightness information for each pixel controlled by the pixel circuit. The pixel circuits may operate using any of a number of different color encoding schemes including:

YUV or YCrCb or YPbPr colorspaces

RGB (Red, Green, and Blue) colorspace

HSV (Hue, Saturation, and Value) colorspace

CMYK (Cyan, Magenta, Yellow, and blacK) colorspace

The pixel circuit translates the received color information into the values needed to drive a set of red, green, and blue pixels in order to generate the desired color. To generate very accurate colors, each individual pixel circuit may take into account the current being provided to the LEDs and the current temperature. The pixel circuit will adjust the output intensity values for each colored LED depending on the current temperature and the current that will be provided to the LED.

A display system that performs colorspace conversion at the pixel level provides some advantages. The system providing the display information can be simplified since the system providing the image data does not have to perform colorspace conversion. Instead, that colorspace conversion is performed at the location wherein the pixel light is generated.

Furthermore, a system that provides full color information down to the pixel light source can provide a higher quality output since the native colorspace may be used directly. For example, the YCbCr colorspace is more efficient than the RGB colorspace since the RGB colorspace has a lot of mutual redundancy. Furthermore, there is no quantization error introduced during the color conversion process. Thus, by providing the YCbCr encoded color information all the way down to the pixel light rendering system, the pixel light rendering system (the pixel circuit) can use the full color information to generate the most accurate color reproduction.

As set forth earlier, a system may improve energy efficiency by providing a voltage source that is not carefully calibrated to obtain an exact desire current but instead efficiently provides a voltage source that provides an approximate desired current. With such a system, the emission spectrum of the LED may be affected. With a pixel circuit that performs color control as set forth above, the color circuitry may adjust the color output in response to the current being provided to the LED. Thus, if the current provided to the LED changes the color output of the LED, that change in color output can be taken in account by the color control circuitry to adjust the output of all the LEDs for that pixel in order to generate a proper final color output. In this manner, the current actually provided to the different color LEDs used to create a colored pixel becomes an input to the color circuitry that determines the proper output intensity for each colored LED.

Automated Addressing System

As set forth in the preceding description, each of the individual LED controller units (760 in FIG. 7) must be given a unique address if all of the individual LED controller units on a single driver line are to be individually controllable. This may be performed by coupling a LED line driver to a single individual LED controller unit on a driver line and transmitting a command from the LED line driver to the that single LED controller unit to burn its address fuses to a particular address value. Then, a series of LED controller units that each have unique addresses may be coupled together in series on a single driver line in a particular pattern thus creating a driver line with individually controllable LED controller units in a known sequence.

To simplify the creation of such strings of LED controller units the address programming logic may be improved with the addition of a "Hall effect" sensor. A Hall effect sensor is an electrical sensor that can detect local magnetic field. To improve the address programming logic a Hall effect sensor may be added in a manner that only allows the address programming logic to be active when the Hall effect sensor detects a particular magnetic field. Thus, if a LED controller unit is not within the defined magnetic field, then the address programming logic will not operate. In this manner, several LED controller units that do not yet have an address burned in may be coupled to the same driver line. Then, to provide unique addresses to the LED controller units on the driver line, each individual LED controller unit will sequentially be placed within the proper magnetic field (one at a time) and command to program a unique address will be sent down the driver line. Since only one LED controller unit will be within the proper magnetic field, only that one LED controller unit will respond to the command to burn in an address. The other LED controllers on the same driver line will ignore the command to burn in an address. Thus, unique addresses can be programmed into each LED controller unit already coupled together into on single driver line by sequentially placing each LED controller unit in the proper magnetic field and then transmitting a command to program in a unique address.

Applications Overview

The single-wire multiple-LED power and control system set forth in the preceding sections and illustrated in FIG. 2A can be used in a very wide variety of applications. In one of the most basic applications, the string of individually controlled lighting units 250 can be deployed as a simple controlled ornamental lighting system such as a string of Christmas tree lights. In such an embodiment, the driver line 221 can be an insulated wire that provides mechanical structure to the string in addition to carrying the electrical power, providing the encoded control data, providing the current reference value, and acting as a heat sink for the individual LED units 250. In such a deployment, the master LED controller system 230 may be a small micro controller that has a set of various different lighting patterns. These lighting patterns are only limited by the imagination of the person that programs the master LED microcontroller system 230. Examples include: Solid lighting with a spectrum of colors, various different blinking light patterns with different colors, progressive activation of LED units such that light source appears to travel down the string, etc.

The nearly infinite number of possible applications for the single-wire multiple-LED power and control system set forth in the preceding sections is beyond the scope of this document. However, the following sections will provide a subset of the many possible applications for the disclosed system.

Controlled Lighting Applications

As set forth in the background of this document, LEDs are now being used in many traditional lighting applications. Two of the biggest reasons for this are the energy efficiency of LEDs and the robustness of LEDs that translates into very low maintenance for LED lighting systems. (LEDs do not need to be replaced as nearly as often as filament based incandescent bulbs or even compact fluorescent bulbs.) However, the higher price of LED based lighting systems has limited their deployment. The single-wire multiple-LED power and control system of the present disclosure reduces the cost of LED based lighting systems while simultaneously improving the feature set of LED based lighting systems. Thus, the single-wire multiple-LED power and control system of the present disclosure can expand the market for LED based lighting systems.

The single-wire multiple-LED power and control system of the present disclosure reduces the cost of LED based lighting systems by reducing the wiring complexity of designing, manufacturing, and installing LED based lighting systems. Specifically, the single driver line (and its return feed to complete circuit) greatly simplifies the wiring required to construct a LED based lighting system. As illustrated in FIG. 2A, one possible embodiment combines the functions of the master LED controller system 230, the power supply 210, and the LED line driver 220 into a single LED Driver System 239 such that only a single driver line 221 (and its return wire 229) drives many individually controlled LED units (250-1 to 250-N). In this manner, the manufacture of a lighting system is greatly simplified. However, the LED lighting system of FIG. 2A allows every LED unit 250 (each having multiple LEDs of different colors) to be individually controlled such that sophisticated multi-colored patterns may be created.

Figure 11A:
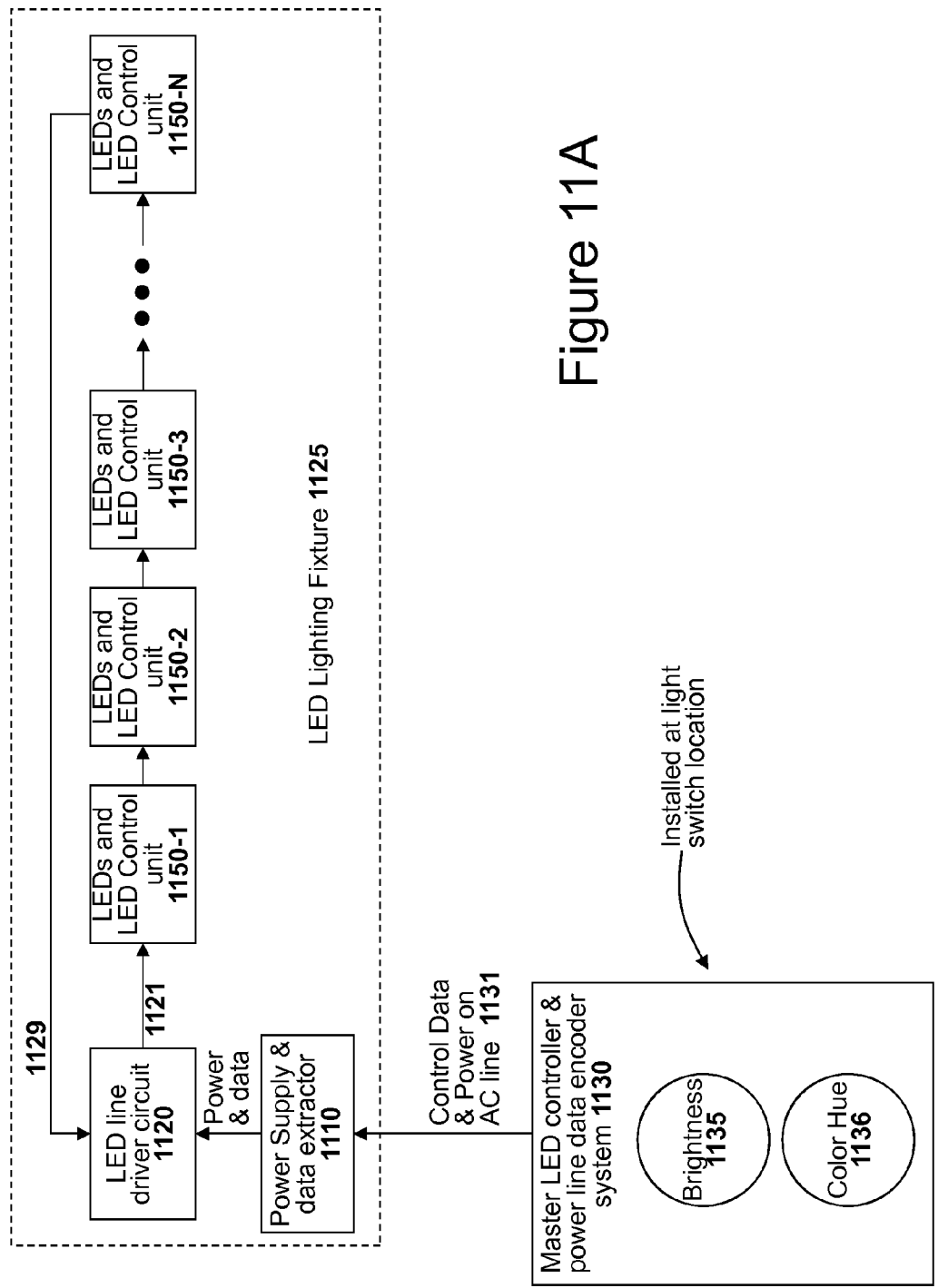
FIG. 11A illustrates a block diagram of a first possible LED lighting system based upon the teachings of the present disclosure.
Figure 11B:
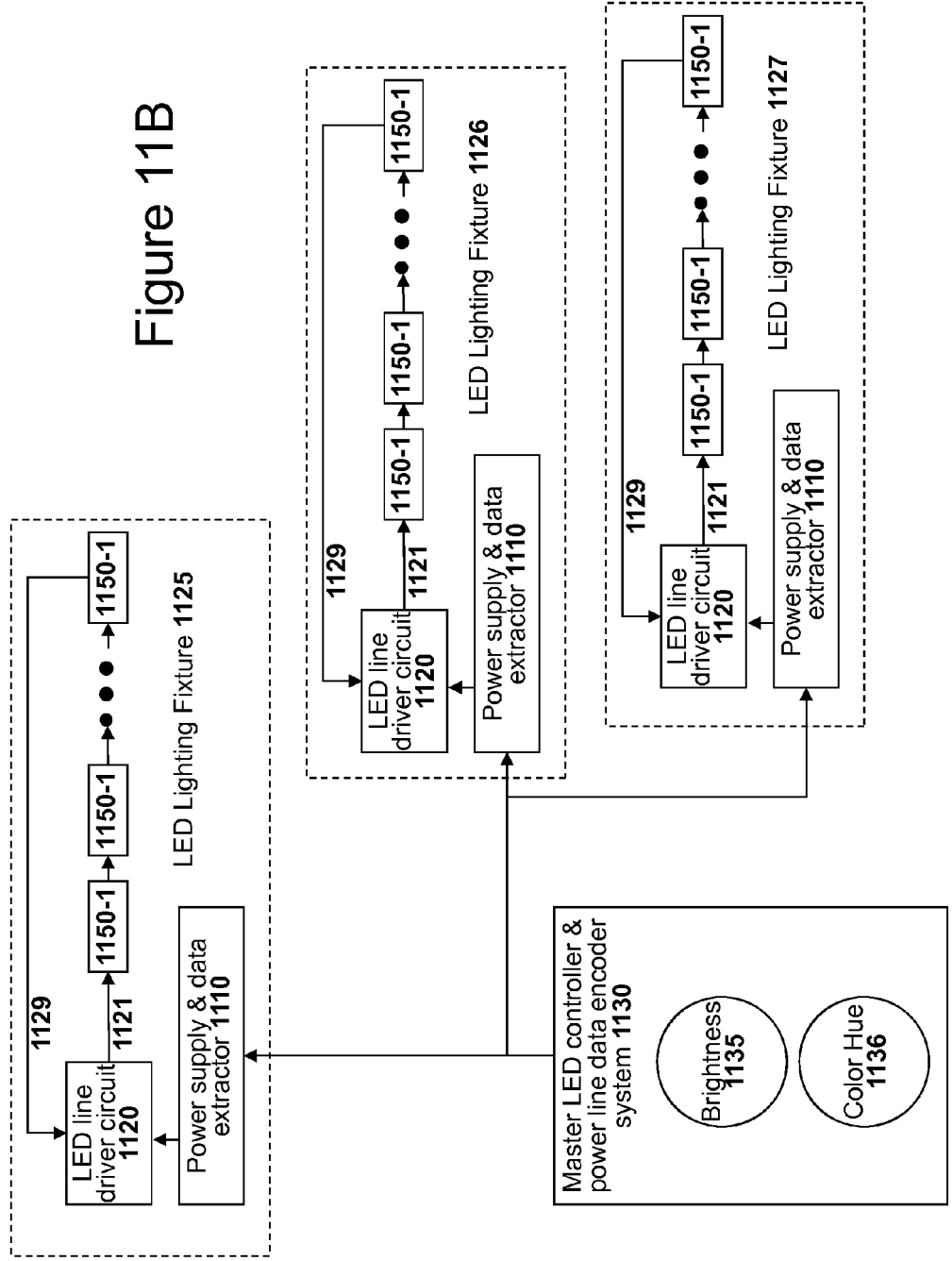
FIG. 11B illustrates the LED lighting system of FIG. 11A wherein multiple LED lighting fixtures are controlled from a single controller.
Figure 12:
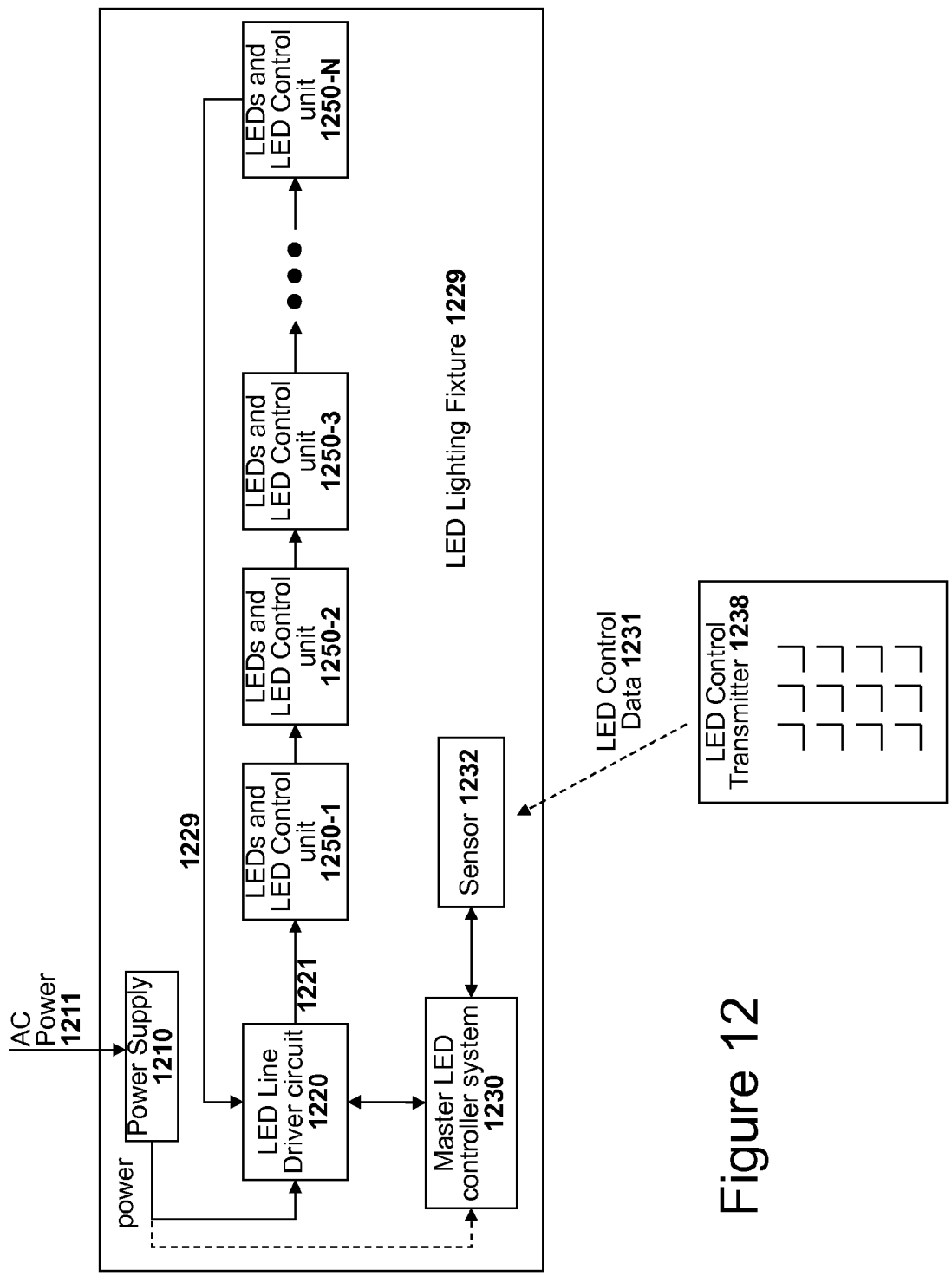
FIG. 12 illustrates a block diagram of a second possible LED lighting system based upon the teachings of the present disclosure.

FIGS. 11A to 12 illustrate block diagrams of possible LED lighting systems that may be constructed using upon the teachings of the present disclosure. Note that these are merely two examples of countless possible lighting fixtures that may be created using the teachings of the present disclosure.

In the embodiment of FIG. 11A, the LED lighting system has been divided into two units: a LED Lighting fixture 1125 and a Master LED controller and power line data encoder system 1130. The embodiment of FIG. 11A can be used in traditional alternating current (AC) lighting environments. The LED Lighting fixture 1125 portion would be installed just like a traditional lighting fixture that is typically controlled by switched AC current. However, instead of a traditional light switch, the Master LED controller and power line data encoder system 1130 is placed where a stand on/off switch would normally be placed.

The Master LED controller and power line data encoder system 1130 includes a power supply, a microcontroller, a user interface, and a power line data encoder. A user interacts with the user interface on the Master LED controller and power line data encoder system 1130 to provide control commands (turn on, turn off, set lights to blue, display rainbow pattern, etc.) The microcontroller and power line data encoder then modulates the control commands onto the power line that couples the Master LED controller and power line data encoder system 1130 to the LED Lighting fixture 1125. Various different well-known power line data modulation systems may be used.

In one possible embodiment illustrated in FIG. 11A, the user interface on the Master LED controller and power line data encoder system 1130 may comprise a pair of dials. A first Brightness dial 1135 could be used to control if the LED lighting fixture is to be powered on and how bright the LEDs should illuminate. A second Color Hue dial 1136 could be used to select a particular color hue for the LED units. A white setting would be placed on the color hue dial 1136 to allow the LED lighting fixture 1125 to act as a normal white light source.

The Master LED controller and power line data encoder system 1130 drives a LED Lighting fixture 1125 that may be installed as a traditional lighting fixture. A power supply and data extractor 1110 in the LED Lighting fixture 1125 receives, demodulates, and extracts the control commands from the control and power line 1131. The power supply and data extractor 1110 then passes the extracted control data and the needed power to the LED line driver 1110 to drive the series of LED units 1150 as set forth in the earlier sections of this document.

A single Master LED controller and power line data encoder system 1130 may drive multiple LED lighting fixtures. For example, FIG. 11B illustrates an embodiment wherein a single Master LED controller and power line data encoder system 1130 controls three LED Lighting fixtures (1125, 1126, and 1127) just as a traditional light switch may control multiple overhead lighting fixtures.

FIG. 12 illustrates an alternative lighting system embodiment that is controlled with a wireless control system. Specifically, FIG. 12 illustrates an alternative lighting system embodiment comprising a LED Lighting fixture 1229 and a wireless LED control transmitter 1238. The LED Lighting fixture 1229 may be installed in the same location and manner as a traditional AC powered lighting fixture. AC Power 1211 to a power supply 1210 in the LED Lighting fixture 1229 generates the needed DC power for the LED Line driver 1220 and a master LED controller system 1230. (Note that in one embodiment, the master LED controller system 1230 may receive operating power from the LED Line driver 1220.)

The master LED controller system 1230 includes sensor circuitry 1232 for receiving wireless commands from a LED Control transmitter 1238. The master LED controller system 1230 decodes commands received from the LED Control transmitter 1238 and passing those commands to LED Line driver 1220. The wireless system may use Bluetooth, infrared light, or any other suitable wireless data transmission system. If an infrared transmission system is used, the functions of the LED Control transmitter 1238 may be handled by a programmable infrared remote control system. Thus, the LED Lighting fixture 1229 of FIG. 12 would be ideal for use in rooms with home theatre systems. The AC power 1211 that powers the LED Lighting fixture 1229 may be from a traditional wall light switch. In order to match the expectations of typical people, the master LED controller system 1230 may always power on the LED lighting fixture to emit white light as its default mode. In this manner, the LED Lighting fixture 1229 will operate just like an ordinary light fixture when the LED Control transmitter 1238 is not being used.

Using the LED String Technology for Stage Lighting Systems

Music concerts and stage plays use special lighting systems to improve the presentation of a live performance. There is an entire industry dedicated to developing and selling lighting hardware and control systems for stage lighting. To allow for interoperation between different components, the United States Institute for Theatre Technology (USITT) has developed a standard communications protocol used to control stage lighting and effects known as DMX512-A. The DMX512-A communications protocol is an EIA-485 based serial protocol for transmitting commands to stage lighting and effects units.

To serve the stage lighting market, the teachings of the present invention may be implemented in conjunction with the popular DMX512-A communications protocol. In a first embodiment, a translation unit may be used to convert from the DMX512-A communications protocol into a native protocol for a LED Line driver unit. For example, referring to FIG. 2A, the master LED controller system 230 may be a microcontroller unit (MCU) that receives commands in the DMX512-A communications protocol on input 232, translates those commands, and then outputs those commands into control data 231 sent in a native protocol for LED line driver unit 220. The LED line driver unit 220 then drives the individually controlled LED units 250 as set forth in the previous sections of this document. The master LED controller system 230 could relay the DMX512-A communications protocol information to a next DMX512-A based device in a daisy chain arrangement.

Figure 13:
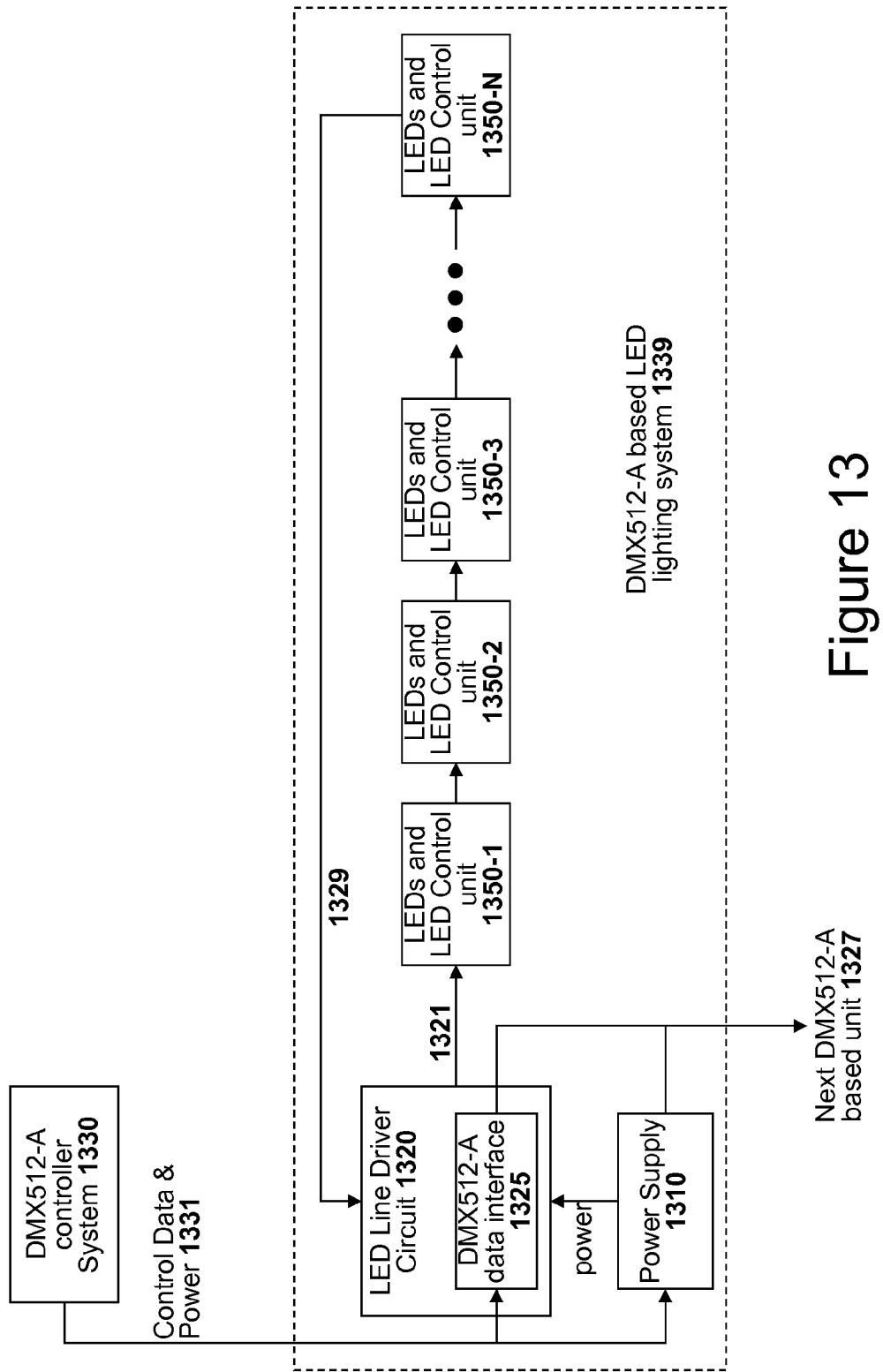
FIG. 13 illustrates the LED driver system of the present disclosure implemented as a DMX512-A protocol based stage lighting system.

The teachings of the present disclosure may also be used in a dedicated DMX512-A based system. FIG. 13 illustrates a dedicated implementation of a line driver 1320 system for DMX512-A based stage lighting system 1339. A traditional DMX512-A based controller system 1330 is used to transmit DMX512-A formatted data 1331 to a DMX512-A based line driver 1320. The same wiring may also carry power that is delivered to a power supply 1310. A DMX512-A data interface 1325 in the line driver 1320 receives and decodes DMX512-A protocol formatted commands.

The line driver 1320 then translates these commands and transmits the translated commands down the driver line 1321 along with current to power the individually controlled LED units 1350. The individually controlled LED units 1350 receive and execute the commands appropriately. Note that the individually controlled LED units 1350 may perform additional functions in addition to just turning on LEDs at various brightness levels. For example, the individually controlled LED units 1350 may incorporate additional features such as panning or tilting the LEDs and using gobos. (Gobos are filters or patterns used in front of light sources to affect the light output.)

The DMX512-A data interface 1325 may output the DMX512-A protocol so that a next DMX512-A based unit 1327 in a daisy-chain string would also receive the control data. Similarly, power signals may also be passed to the next DMX512-A based unit 1327 from power supply 1310.

Using the LED String for Automotive Applications

Automobiles are filled with various light sources. For example, a typical automobile will have at least four turn indicator lights at the corners of the automobile, two brake lights, interior dome lights, license plate lights, a central mounted brake light, trunk lights, engine hood lights, reverse indicator lights, and other additional lights. Each of these different lights may use a different type of bulb due to the particular brightness and color requirements. To drive these various lights, various different bulky wiring harnesses are routed around an automobile. Since there are many different cars and car configurations, there needs to be many different wiring harnesses. This traditional system creates a difficult inventory management problem since a large number of different wiring harnesses and bulbs must be stocked.

To simplify automotive wiring, the single-wire string of multiple LED units set forth in the preceding sections can be used in automotive environments. A single wire can be routed around an automobile connecting all the various different light outputs on the automobile (with extra slack at each light output). For example, a single wire could start at a control location and then route to the front left indicator lights, the front right indicator lights, the interior dome lights, the right rear indicator lights, the right rear brake lights, the left rear indicator lights, the left rear brake lights, the reverse indicator light, the license plate light, the trunk/hatch lights, to any other needed light location, and eventually back to the central control location. Then, at each point where a light source is needed, the wire is cut and a controlled LED light unit (250 from FIG. 2) is coupled to the wire in a serial manner.

The control of all the light units on the string is then handled by a centralized control unit (such as LED driver system 239). Since the centralized control unit controls exactly how light is output from each light unit (the color, the brightness, and changes to those), the same light output unit could be used in all of the different locations. For example, centralized control unit would ensure that turn signal indicator lights blinked yellow, brake lights output red, and reverse indicator lights output white. For added safety, two independent strings could be run in parallel such that if one string malfunctioned, the other string would continue to operate. Even with two systems running in parallel, such a two wire system would still be much less complex than the myriad of wires in traditional automotive electrical harnesses.

Since the lighting system of the present disclosure is completely controllable, the centralized control unit in an automobile could use the automobile lighting in different manners than they are normally used. For example, if an automobile is stolen, then a wireless communication system (such as cellular telephone network or the OnStar system) could instruct the lighting system to begin flashing all the lights on the vehicle in an annoying conspicuous pattern that would make the stolen car stand out. Similarly, the same technique could be used to help a person find a car when they cannot find it in a large parking lot. The lights on the car can also be used to output information in various manners. For example, a row of external lights on a car can be used to output battery charge status (or any other data) in a bar diagram manner. The controlled light output could also be used to output coded information to various sensors placed along roadways. For example, parking garages or toll booths may have sensors that detect various identification patterns in order to admit entry or bill a specific automobile for usage of a service.

In addition to simplifying automobile construction and automobile parts inventory management, the LED string system of the present disclosure is very energy efficient. As automobiles eventually transition from gasoline to electricity, the efficiency of all the electrical systems in an automobile becomes very important. Thus, the LED based lighting system of the present disclosure would be ideal for use within electric vehicles. Not only does the system use energy efficient LEDs as light sources but the amount of light can be carefully controlled depending upon need. For example, brake lights may need to output a significant amount of light during the daytime in order to be seen but can be adjusted to output less light at night (and thus save energy).

Using the LED String for Modular Display Systems

The single-wire multiple-LED power and control system set forth in the preceding sections can be used to create display systems. Specifically, referring to the FIG. 2A, the individually controlled LED units 250 may be arranged into a two-dimensional pattern such that the individually controlled LED units 250 can controlled as individual pixels in a display system.

Figure 14:
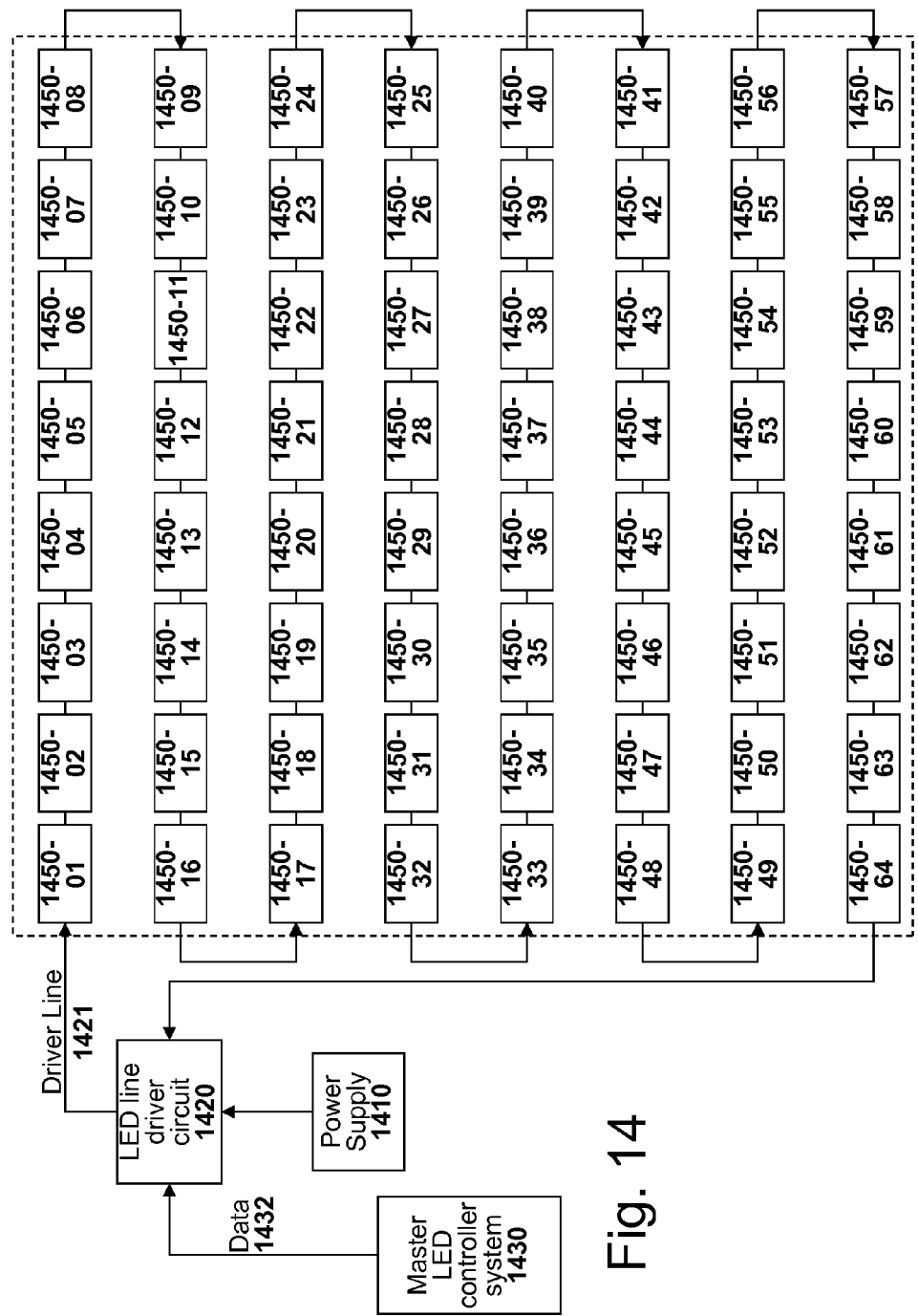
FIG. 14 illustrates an application wherein a single LED line driver is driving sixty-four individually controlled LED units that have been arranged in an eight by eight array.

FIG. 14 illustrates an example system wherein a single LED line driver 1420 is being used to drive sixty-four individually controlled LED units (1450-1 to 1450-64) that have been arranged in an eight by eight, two-dimensional array. With two-hundred and fifty-six individually controlled LED units on a single driver line, a sixteen by sixteen array could be created. (Note that this is one simple example, modules of different sizes and shapes may be created and those modules may be combined in any desired pattern.) A single power supply 1410 provides the power for the LED line driver 1420 and the entire array of individually controlled LED units (1450-1 to 1450-64). One of the most important aspects of the two-dimensional array system illustrated in FIG. 14 is that only a single wire is used to couple all of the individually controlled LED units (1450-1 to 1450-64) to the driver line 1421. This allows the array system of FIG. 14 to be very simple to construct.

Figure 15:
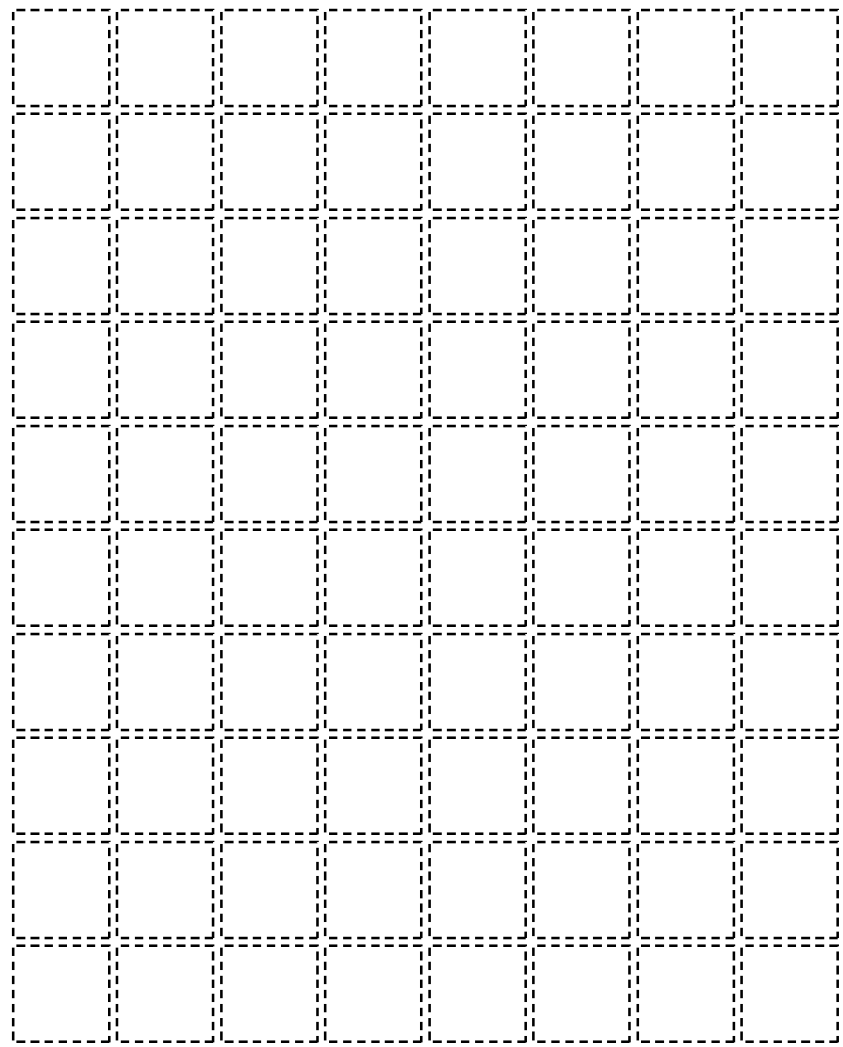
FIG. 15 conceptually illustrates how smaller modular two-dimensional arrays (illustrated in FIG. 14) may be combined to create larger two-dimensional display systems.

The LED line driver 1420 is controlled by a master LED controller system 1430 that sends pixel control data 1432 to the LED line driver 1420. In addition to controlling the LED line driver 1420, the master LED controller system 1430 may control many other LED line drivers that each drive their own associated eight by eight arrays. By combining multiple arrays in a modular manner, larger display systems can be combined. For example, FIG. 15 conceptually illustrates a ten by eight array of smaller two-dimensional modular arrays. If the eight by eight array of FIG. 14 were used in the arrangement of FIG. 15, the entire display would be 80 by 64 pixels. Higher resolution displays can be created using more individually controlled LED units in each modular unit and/or more modular units.

In addition to two-dimensional display systems, the disclosed LED strings may be arranged into three dimensional patterns. With a three dimensional arrangement of LED strings, three-dimensional images may be created.

Using the LED String for String Display Systems

Figure 16:
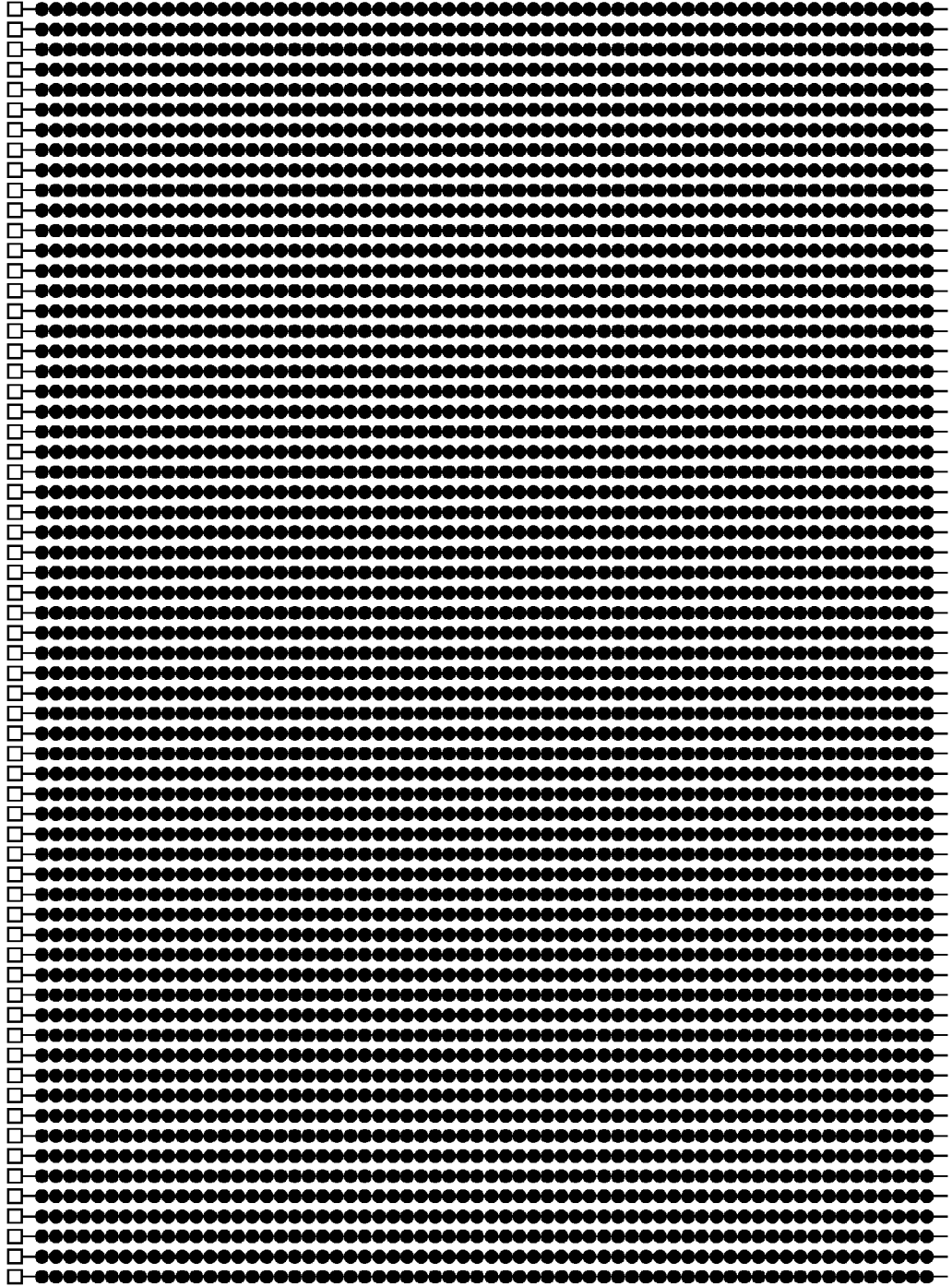
FIG. 16 illustrates several strings of individually controlled LED units hung parallel to each other to create a two dimensional display system.

The single-wire multiple-LED power and control system set forth in the preceding sections can also be used to create various different non-traditional display systems. For example, several long strings of individually controlled LED units can be hung parallel to each other to create a two dimensional display system as illustrated in FIG. 16. At the head of each string, a line driver unit drives a single line to control all of the individually controlled LED units on the string. All of the line driver circuits can be controlled by a single master controller system that sends out the appropriate data to render images on the array. The display system of FIG. 16 could easily be rolled up, transported, and set up anywhere that a large display system is needed. In another embodiment, the individually controlled LED units could be mounted on a flexible sheet like a traditional retracting, reflecting projection screen since a flat flexible wire could be used to couple the individually controlled LED units. Such a display system could also be rolled up like a carpet, transported, and set up anywhere a large display system is needed.

With the deployment of multiple coordinated strings of individually controlled LED units, virtually any surface (or even non surface in the case of dangling strings) can be made into a display system. The deployment of the multiple strings of individually controlled LED units does not even have to be done in any careful manner. As long as some type of two-dimensional pattern is created, a calibration system can be used to identify a two dimensional pattern and calibrate to that pattern. An example is provided with reference to FIGS. 17 and 18.

Figure 17:
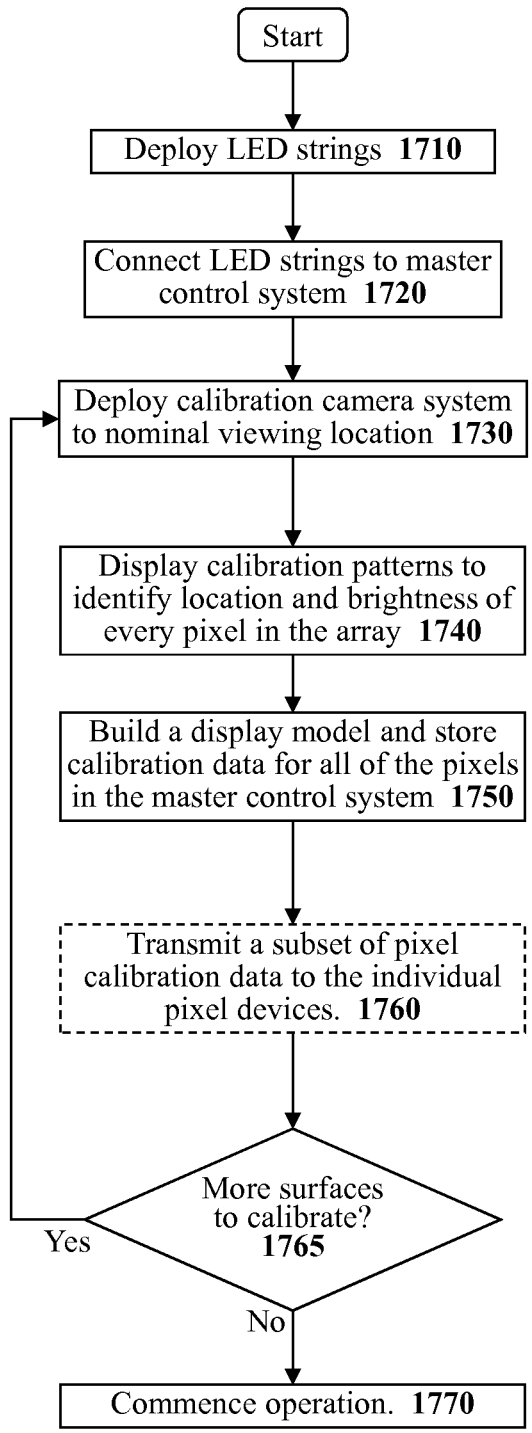
FIG. 17 illustrates a flow diagram describing a method of deploying, calibrating, and operating a display system created from multiple strings of LED units.

Referring to FIG. 17, the creation of a free-form display system begins by deploying several strings of individually controlled LED units at stage 1710. The strings may be deployed in any manner that creates at least some type of two-dimensional pattern when viewed from vantage point away from the LED strings. For example, a building could have multiple different LED strings attached to one side of the building. Multiple two-dimensional arrays may also be created and controlled. For example, a van could be wrapped with multiple LED strings such that the two main sides of the van could serve as two-dimensional arrays.

Next, at stage 1720, all of the LED strings would be coupled to a single master LED control system such as a computer system. The master LED control system would be informed as to the number of LED strings attached and given addressing information that would allow the master LED control system to uniquely address each of the LED units. Note that at this point, the master LED control system would have no information about the topology of the deployed LED strings.

A calibration camera system is then deployed at a nominal viewing vantage point for the display system at stage 1730. With the example of LED strings attached to the side of a building, a good vantage point may be on the sidewalk across the street from the building. With the example of a van, a good vantage point might be twenty feet from the side of the van. (Note that both sides of the van would be handled with two different calibration runs.) After positioning the calibration camera system, the master LED control system would then display a set of calibration patterns at stage 1740. The calibration patterns are used to identify the location and relative brightness of every LED unit on the various LED strings. This calibration allows a two-dimensional pattern of the deployed LED units to be identified. LED units that are not seen by the calibration camera (perhaps due to being blocked from view in the example of LED units on the other side of a van) are ignored.

This calibration system would likely involve a connection between the master controller system and the calibration system in order to easily correlate between a current calibration pattern being displayed and the image captured by the calibration system. However, a coding system wherein the address of each LED unit is transmitted by a color output, a blinking pattern, or a combination thereof can also be used to match calibration displays to captured calibration images.

After capturing the calibration patterns and using those patterns to identify the relative location and brightness of each LED unit that calibration information is stored in the master LED control system at step 1750. At this point, the master LED control system has information about the topology of all the visible LED units which is used to create a model of a two-dimensional array. The master LED control system can render images by translating images using the model and then sending out the appropriate messages to the LED units. The master LED control system may share some of the calibration duties to the individual LED units by sending a subset of calibration information to the individual LED units as set forth in optional stage 1760. For example, a particular LED unit may not be pointed toward the calibration camera system's vantage point making it appear less bright than the other LED units. To compensate for this, the calibration data in that particular LED unit may specify that it should increase the brightness of that LED unit.

After deploying the LED strings, capturing calibration information, and building a model of the two-dimensional array, the freeform display system is ready for operation at step 1770. However if more than one two-dimensional array was created with the LED strings, then more than one display system may be defined. For example, with a van covered with LED strings, a second display system can be created by selecting a second vantage point on the other side of the van. Thus, at stage 1765, a user may opt to repeat stage 1730 to 1760 for another two-dimensional surface (i.e. the other side of the van) such that another display system model may be created from the same set of LED strings.

Figure 18:
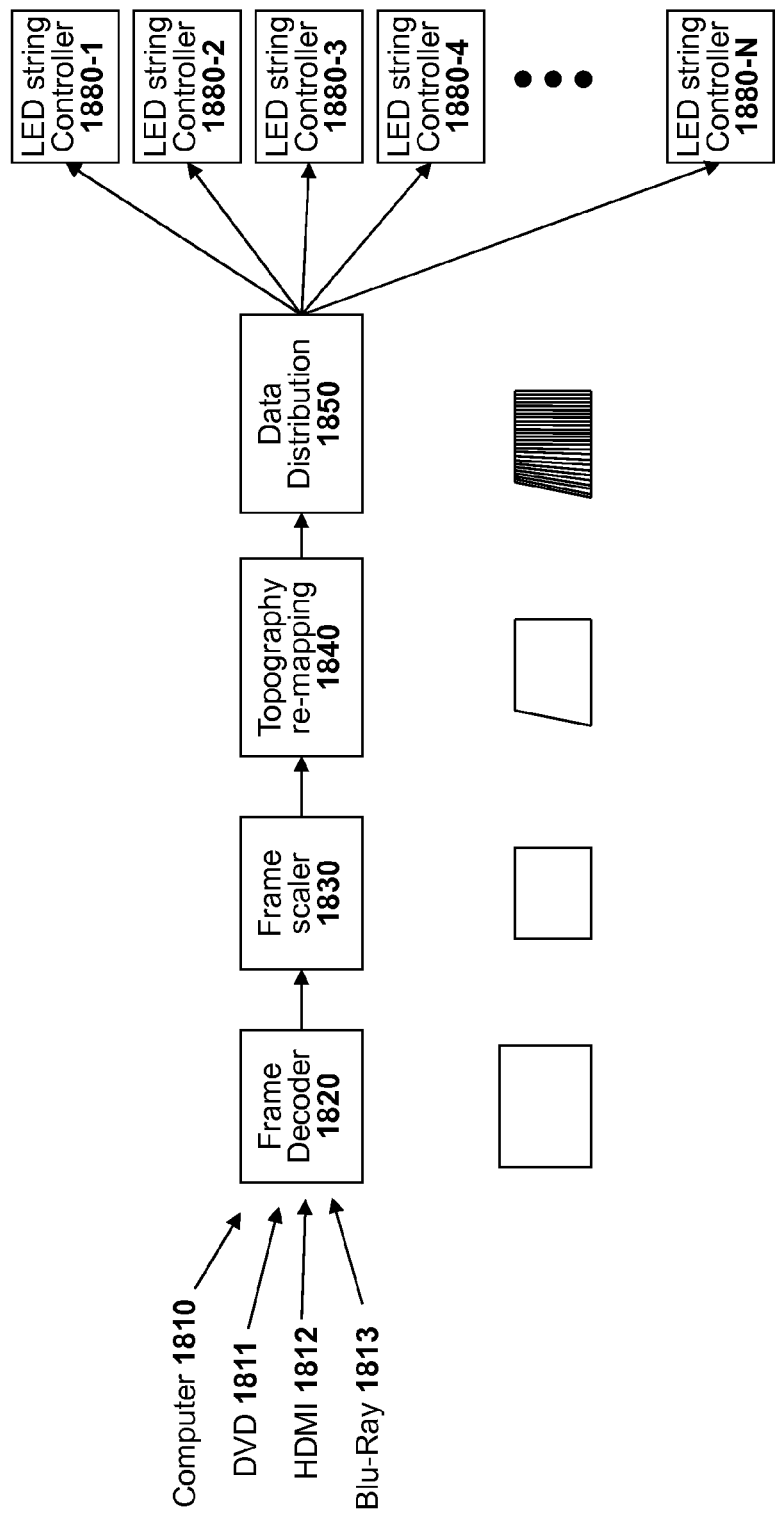
FIG. 18 illustrates a data flow diagram describing how an incoming video signal may be decoded and processed by a LED display system model to generate LED control commands that drive a display system constructed using a deployed set of LED strings.

FIG. 18 illustrates how a deployed set of LED strings having display model created using the method of FIG. 17 can be used to display video information. The display system uses the model to translate video information into LED control commands sent to the individual LED units.

Starting at the left side of FIG. 18, any type of appropriate video source including a computer system 1810, a DVD 1811, HDMI 1812, Blu-Ray 1813, or other video source is provided to a frame decoder 1820. The frame decoder 1820 decodes the original video source into a series of digital frame representations. Below the frame decoder 1820 is a conceptual illustration of the original video frame.

Next, a frame scaler 1830 adjusts the scale of the original source frame to a size appropriate for the display. For example, the resolution of the original video frame may need to be reduced or expanded using interpolation. The frame scaler 1830 may access only a subset of the original video frame to reduce the amount of video information that needs to be processed. Below the frame scaler 1830 is a conceptual illustration of a video frame that has been reduced in size from the original video frame below the frame decoder 1820.

Next, a topography remapping of the source video occurs at stage 1840. The free-form display system will likely not have a neat two-dimensional array that exactly maps onto a traditional rectangular video frame. Thus, image clipping, frame distortion, and pixel interpolation may occur to make the video source frame map onto the free-form display system. Below the topography remapping stage 1840 is a conceptual image of a distorted frame to compensate for the non rectangular shape of a free-form display.

Finally, a data distribution system 1850 scans the modified source frame and creates a set of LED unit commands to send out to the appropriately addressed LED units according to the display model. Below data distribution system 1850 is a conceptual model of the various display strings that create the free-form display system. The data distribution system 1850 sends out the LED update commands to the various LED string controllers (1880-1 to 1880-N). By repeating the stages of 1820 to 1850 for each original source video frame, video information can be displayed on a free-form display system created using a set of LED strings (with individually controlled LED units) and a model of the deployed LED strings as created with the method of FIG. 17.

The preceding technical disclosure is intended to be illustrative, and not restrictive. For example, the above-described embodiments (or one or more aspects thereof) may be used in combination with each other. Other embodiments will be apparent to those of skill in the art upon reviewing the above description. The scope of the claims should, therefore, be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract is provided to comply with 37 C.F.R. §1.72 (b), which requires that it allow the reader to quickly ascertain the nature of the technical disclosure. The abstract is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment.

We claim:

1. A digitally controlled power distribution system, said digitally controlled power distribution system comprising:
    a power supply for supplying an electrical current on a single conductor line;
    a line driver circuit, said line driver modulating a clocked signal onto said electrical current on said single conductor line; and
    more than one controlled circuit unit coupled in a series arrangement to said single conductor line, each said controlled circuit unit periodically drawing said electrical current on said single conductor line by unshunting said electrical current, each said circuit unit normally shunting said electrical current when not drawing said electrical current
    wherein one of said more than one controlled circuit units shunts or unshunts said electrical current during a designated time slot of said clocked signal to communicate back to said line driver circuit.

2. The digitally controlled power distribution system as set forth in claim 1 wherein said more than one circuit units comprises a light emitting diode.

3. The digitally controlled power distribution system as set forth in claim 1 wherein said line driver modulates said clocked signal onto said electrical current using increases and decreases of electrical current.

4. The digitally controlled power distribution system as set forth in claim 1 wherein said shunting and unshunting is performed with a shunt transistor.

5. The digitally controlled power distribution system as set forth in claim 1 wherein said clocked signal further comprises control data.

6. The digitally controlled power distribution system as set forth in claim 1 wherein each said circuit unit uses said electrical current on said single conductor line as a reference current.

7. The digitally controlled power distribution system as set forth in claim 1 wherein each said circuit unit uses said single conductor line as a heat sink.

8. A method of providing electrical power to and communicating with more than one circuit unit coupled in series to a single conductor line, said method comprising:
    driving said single conductor line with a direct current;
    modulating a clocked signal onto said direct current with a line driver circuit;
    periodically drawing said direct current on said single conductor line in said more than one circuit units by unshunting said direct current, each said more than one circuit units shunting said direct current when not drawing said direct current;
    wherein one of said more than one controlled circuit units shunts or unshunts said electrical current during a designated time slot of said clocked signal to communicate back to said line driver circuit.

9. The method of providing electrical power to and communicating with more than one circuit unit coupled in series to a single conductor line as set forth in claim 8 wherein said more than one circuit units comprises a light emitting diode.

10. The method of providing electrical power to and communicating with more than one circuit unit coupled in series to a single conductor line as set forth in claim 8 wherein modulating said clocked signal onto said direct current comprises using increases and decreases of said direct current.

11. The method of providing electrical power to and communicating with more than one circuit unit coupled in series to a single conductor line as set forth in claim 8 wherein said clocked signal comprises a data frame comprising a plurality of numbered data bits and each of said more than one circuit units are only allowed to draw electrical current from said single conductor line during a subset of said numbered data bits.

12. The method of providing electrical power to and communicating with more than one circuit unit coupled in series to a single conductor line as set forth in claim 8 wherein said clocked signal further comprises control data.

13. The method of providing electrical power to and communicating with more than one circuit unit coupled in series to a single conductor line as set forth in claim 8 wherein each said circuit unit uses said direct current on said single conductor line as a reference current.

14. The method of providing electrical power to and communicating with more than one circuit unit coupled in series to a single conductor line as set forth in claim 8 wherein each said circuit unit uses said output line as a heat sink.

* * * * *